(12) United States Patent
Stearns et al.

(10) Patent No.: US 12,244,260 B2
(45) Date of Patent: Mar. 4, 2025

(54) ROOF MOUNTING SYSTEM

(71) Applicant: EcoFasten Solar, LLC, Phoenix, AZ (US)

(72) Inventors: Brian Cecil Stearns, Tucson, AZ (US); Alexander Grant Bornemann, Duxbury, VT (US)

(73) Assignee: EcoFasten Solar, LLC, Phoenix, AZ (US)

( * ) Notice: Subject to any disclaimer, the term of this patent is extended or adjusted under 35 U.S.C. 154(b) by 53 days.

(21) Appl. No.: 17/403,240

(22) Filed: Aug. 16, 2021

(65) Prior Publication Data

US 2021/0376782 A1 Dec. 2, 2021

Related U.S. Application Data

(63) Continuation of application No. 16/673,433, filed on Nov. 4, 2019, now Pat. No. 11,121,669, which is a continuation of application No. 15/934,749, filed on Mar. 23, 2018, now Pat. No. 10,469,023, which is a continuation-in-part of application No. 15/701,378, filed on Sep. 11, 2017, now abandoned.

(60) Provisional application No. 62/475,684, filed on Mar. 23, 2017, provisional application No. 62/393,565, filed on Sep. 12, 2016.

(51) Int. Cl.
*H02S 20/24* (2014.01)
*F16B 2/12* (2006.01)
*F16B 5/02* (2006.01)

(52) U.S. Cl.
CPC ............... *H02S 20/24* (2014.12); *F16B 2/12* (2013.01); *F16B 5/0233* (2013.01); *Y02B 10/10* (2013.01)

(58) Field of Classification Search
CPC ....... H02S 20/23; F16B 5/0233; F24J 2/5233; F24J 2/5258; F24S 25/33
See application file for complete search history.

(56) References Cited

U.S. PATENT DOCUMENTS

| | | |
|---|---|---|
| 4,321,745 A | 3/1982 | Ford |
| 4,558,544 A | 12/1985 | Albrecht et al. |
| 4,744,187 A | 5/1988 | Tripp |
| 4,796,403 A | 1/1989 | Fulton |

(Continued)

FOREIGN PATENT DOCUMENTS

| | | |
|---|---|---|
| DE | 10062697 | 6/2006 |
| DE | 102005002828 | 8/2006 |

(Continued)

OTHER PUBLICATIONS

Office Action from the United States Patent Office for U.S. Appl. No. 15/701,378 dated Aug. 23, 2018 (6 pages).

(Continued)

*Primary Examiner* — Gisele D Ford
(74) *Attorney, Agent, or Firm* — KW Law, LLP

(57) ABSTRACT

In various embodiments, the mounting systems described herein may be configured to mount a solar panel array to a flat concrete roof like those found throughout the Caribbean and Central and South America. Other systems described herein may be configured to facilitate mounting structures on standing seam metals roofs. Still other systems described herein may be configured to facilitate mounting structures on composite shingle, slate, or tile roofs. The mounting systems described herein may be configured as rail-less or rails free roof mounting systems.

16 Claims, 38 Drawing Sheets

(56) References Cited

U.S. PATENT DOCUMENTS

| | | | |
|---|---|---|---|
| 5,094,056 A | 3/1992 | Peters | |
| 5,274,978 A | 1/1994 | Perkonigg et al. | |
| 5,333,423 A | 8/1994 | Propst | |
| 5,479,745 A | 1/1996 | Kawai et al. | |
| 5,501,754 A | 3/1996 | Hiraguri | |
| 5,595,366 A | 1/1997 | Cusimano et al. | |
| 5,791,096 A | 8/1998 | Chen | |
| 5,862,635 A | 1/1999 | Linse et al. | |
| 6,024,330 A | 2/2000 | Mroz et al. | |
| 6,360,491 B1 | 3/2002 | Ullman | |
| 6,442,906 B1 | 9/2002 | Hwang | |
| 6,453,623 B1 | 9/2002 | Nelson et al. | |
| 6,536,729 B1 | 3/2003 | Haddock | |
| 6,672,018 B2 | 1/2004 | Shingleton | |
| 6,772,564 B2 | 8/2004 | Leon | |
| 7,001,098 B2 | 2/2006 | Lin et al. | |
| 7,174,677 B1 | 2/2007 | Dressler | |
| 7,592,537 B1 | 9/2009 | West | |
| 7,600,349 B2 | 10/2009 | Liebendorfer | |
| 7,857,269 B2 | 12/2010 | Plaisted et al. | |
| 8,109,048 B2 | 2/2012 | West et al. | |
| 8,122,648 B1 | 2/2012 | Liu | |
| 8,146,299 B2 | 4/2012 | Stearns et al. | |
| 8,151,522 B2 | 4/2012 | Stearns et al. | |
| 8,153,700 B2 | 4/2012 | Stearns et al. | |
| 8,166,713 B2 | 5/2012 | Stearns et al. | |
| 8,166,720 B2 | 5/2012 | Garrigus | |
| 8,177,180 B2 | 5/2012 | Plaisted et al. | |
| 8,181,398 B2 | 5/2012 | Stearns et al. | |
| 8,209,914 B2 | 7/2012 | Stearns et al. | |
| 8,225,557 B2 | 7/2012 | Stearns et al. | |
| 8,245,454 B2 | 8/2012 | Stearns et al. | |
| 8,272,174 B2 | 9/2012 | Stearns et al. | |
| 8,328,149 B2 | 12/2012 | McLaughlin | |
| 8,375,654 B1 | 2/2013 | West et al. | |
| 8,397,443 B2 | 3/2013 | Blom et al. | |
| 8,413,388 B2 | 4/2013 | Stearns et al. | |
| 8,505,864 B1 | 8/2013 | Taylor et al. | |
| 8,584,406 B2 | 11/2013 | Wexler et al. | |
| 8,627,617 B2 | 1/2014 | Haddock et al. | |
| 8,683,761 B2 | 4/2014 | Danning | |
| 8,733,037 B2 | 5/2014 | Bindschedler et al. | |
| 8,756,881 B2 | 6/2014 | West et al. | |
| 8,806,813 B2 | 8/2014 | Plaisted et al. | |
| 8,833,714 B2 | 9/2014 | Haddock et al. | |
| 8,857,113 B2 | 10/2014 | Zhang | |
| 8,875,455 B1 | 11/2014 | Yang et al. | |
| 8,925,263 B2 | 1/2015 | Haddock et al. | |
| 8,938,932 B1 | 1/2015 | Wentworth et al. | |
| 8,943,765 B2 | 2/2015 | Danning et al. | |
| 8,946,540 B1 | 2/2015 | West et al. | |
| 8,955,267 B2 | 2/2015 | Wexler et al. | |
| 8,984,819 B1 | 3/2015 | Yang et al. | |
| 8,991,114 B2 | 3/2015 | West | |
| 9,003,729 B2 | 4/2015 | West et al. | |
| 9,010,040 B2 | 4/2015 | Damo | |
| 9,010,041 B2 | 4/2015 | Danning | |
| 9,062,897 B2 | 6/2015 | West et al. | |
| 9,080,792 B2 | 7/2015 | Patton et al. | |
| 9,097,441 B2 | 8/2015 | West et al. | |
| 9,106,023 B2 | 8/2015 | Schaefer | |
| 9,109,371 B2 | 8/2015 | Hudson et al. | |
| 9,121,545 B2 | 9/2015 | Stanley | |
| 9,145,685 B2 | 9/2015 | Stapleton | |
| 9,154,074 B2 | 10/2015 | West et al. | |
| 9,166,524 B2 | 10/2015 | West et al. | |
| 9,231,517 B2 | 1/2016 | West et al. | |
| 9,506,600 B1 | 11/2016 | Li | |
| 2002/0046506 A1 | 4/2002 | Ullman | |
| 2003/0070368 A1 | 4/2003 | Shingleton | |
| 2004/0163338 A1 | 8/2004 | Liebendorfer | |
| 2006/0010786 A1 | 1/2006 | Rogers | |
| 2006/0053706 A1 | 3/2006 | Russell | |
| 2006/0086382 A1 | 4/2006 | Plaisted | |
| 2006/0260670 A1 | 11/2006 | Terunuma et al. | |
| 2007/0245636 A1 | 10/2007 | Ayer | |
| 2008/0053008 A1 | 3/2008 | Ohkoshi et al. | |
| 2008/0087275 A1 | 4/2008 | Sade | |
| 2008/0121273 A1 | 5/2008 | Plaisted et al. | |
| 2008/0250614 A1 | 10/2008 | Zante | |
| 2009/0000220 A1 | 1/2009 | Lennox | |
| 2009/0194098 A1 | 8/2009 | Placer | |
| 2009/0282755 A1 | 11/2009 | Abbott et al. | |
| 2009/0309388 A1 | 12/2009 | Ellison | |
| 2010/0236155 A1 | 9/2010 | Lanza | |
| 2010/0276558 A1 | 11/2010 | Faust | |
| 2010/0307074 A1 | 12/2010 | Stearns et al. | |
| 2011/0000519 A1 | 1/2011 | West | |
| 2011/0000520 A1 | 1/2011 | West | |
| 2011/0000526 A1 | 1/2011 | West | |
| 2011/0000544 A1 | 1/2011 | West | |
| 2011/0001030 A1 | 5/2011 | Hochreiter et al. | |
| 2011/0154750 A1 | 6/2011 | Welster et al. | |
| 2011/0214365 A1 | 9/2011 | Aftanas | |
| 2011/0239546 A1 | 10/2011 | Tsuzuki et al. | |
| 2011/0260027 A1 | 10/2011 | Farnham, Jr. | |
| 2011/0277402 A1 | 11/2011 | Schnitzer | |
| 2011/0302857 A1 | 12/2011 | McClellan et al. | |
| 2011/0302859 A1 | 12/2011 | Crasnianski | |
| 2012/0017526 A1 | 1/2012 | Eide | |
| 2012/0023843 A1 | 2/2012 | Stearns et al. | |
| 2012/0073219 A1 | 3/2012 | Zuritis | |
| 2012/0073220 A1 | 3/2012 | Kobayashi et al. | |
| 2012/0079781 A1 | 4/2012 | Koller | |
| 2012/0102853 A1 | 5/2012 | Rizzo | |
| 2012/0125410 A1 | 5/2012 | West et al. | |
| 2012/0138764 A1 | 6/2012 | Kemple | |
| 2012/0144760 A1 | 6/2012 | Schaefer et al. | |
| 2012/0152326 A1 | 6/2012 | West et al. | |
| 2012/0192926 A1 | 8/2012 | Kambara et al. | |
| 2012/0233958 A1 | 9/2012 | Stearns | |
| 2012/0234378 A1 | 9/2012 | West et al. | |
| 2012/0240484 A1 | 9/2012 | Blom et al. | |
| 2012/0255598 A1 | 10/2012 | West | |
| 2012/0260972 A1 | 10/2012 | West et al. | |
| 2012/0266946 A1 | 10/2012 | West et al. | |
| 2012/0279558 A1 | 11/2012 | West et al. | |
| 2012/0298186 A1 | 11/2012 | West | |
| 2012/0298188 A1 | 11/2012 | West et al. | |
| 2012/0298817 A1 | 11/2012 | West et al. | |
| 2012/0301661 A1 | 11/2012 | West et al. | |
| 2013/0008102 A1 | 1/2013 | Bindschedler et al. | |
| 2013/0009025 A1 | 1/2013 | Stearns | |
| 2013/0011187 A1 | 1/2013 | Schuit | |
| 2013/0074441 A1 | 3/2013 | Stearns | |
| 2013/0091786 A1 | 4/2013 | DuPont et al. | |
| 2013/0104471 A1 | 5/2013 | Kobayashi | |
| 2013/0125492 A1 | 5/2013 | Molek et al. | |
| 2013/0140416 A1 | 5/2013 | West et al. | |
| 2013/0180572 A1 | 7/2013 | West | |
| 2013/0180573 A1 | 7/2013 | West | |
| 2013/0180574 A1 | 7/2013 | West et al. | |
| 2013/0183084 A1 | 7/2013 | West et al. | |
| 2013/0192150 A1 | 8/2013 | DuPont et al. | |
| 2013/0284239 A1 | 10/2013 | Hyunrok | |
| 2013/0291479 A1 | 11/2013 | Schaefer et al. | |
| 2013/0333305 A1 | 12/2013 | Stearns et al. | |
| 2013/0333310 A1 | 12/2013 | Damo | |
| 2013/0340811 A1 | 12/2013 | Danning et al. | |
| 2014/0026946 A1 | 1/2014 | West et al. | |
| 2014/0041321 A1 | 2/2014 | Poivet | |
| 2014/0042286 A1 | 2/2014 | Jaffari | |
| 2014/0053891 A1 | 2/2014 | West et al. | |
| 2014/0102997 A1 | 4/2014 | West et al. | |
| 2014/0109496 A1 | 4/2014 | Stapleton | |
| 2014/0130847 A1 | 4/2014 | West et al. | |
| 2014/0137674 A1 | 5/2014 | Habdank et al. | |
| 2014/0158184 A1 | 6/2014 | West et al. | |
| 2014/0174511 A1 | 6/2014 | West et al. | |
| 2014/0175244 A1 | 6/2014 | West et al. | |
| 2014/0182662 A1 | 7/2014 | West et al. | |
| 2014/0182663 A1 | 7/2014 | Kuo | |
| 2014/0223838 A1 | 8/2014 | West et al. | |
| 2014/0246549 A1 | 9/2014 | West et al. | |

(56) References Cited

U.S. PATENT DOCUMENTS

| | | |
|---|---|---|
| 2014/0251431 A1 | 9/2014 | West et al. |
| 2014/0252288 A1 | 9/2014 | Stearns et al. |
| 2014/0299179 A1 | 10/2014 | West et al. |
| 2014/0305046 A1 | 10/2014 | Stearns et al. |
| 2014/0326838 A1 | 11/2014 | West et al. |
| 2014/0331572 A1 | 11/2014 | Singelyn, Jr. |
| 2014/0339179 A1 | 11/2014 | West et al. |
| 2014/0353435 A1 | 12/2014 | Liu et al. |
| 2014/0360111 A1 | 12/2014 | Kuan |
| 2014/0360558 A1 | 12/2014 | West et al. |
| 2015/0013756 A1 | 1/2015 | West et al. |
| 2015/0033658 A1 | 2/2015 | West et al. |
| 2015/0040965 A1 | 2/2015 | West et al. |
| 2015/0040967 A1 | 2/2015 | West et al. |
| 2015/0041251 A1 | 2/2015 | Hudson et al. |
| 2015/0068590 A1 | 3/2015 | West et al. |
| 2015/0069198 A1 | 3/2015 | West et al. |
| 2015/0075100 A1 | 3/2015 | West et al. |
| 2015/0075589 A1 | 3/2015 | West et al. |
| 2015/0075590 A1 | 3/2015 | West et al. |
| 2015/0107168 A1 | 4/2015 | Kobayashi |
| 2015/0129517 A1 | 5/2015 | Wildes |
| 2015/0155820 A1 | 6/2015 | West |
| 2015/0155821 A1 | 6/2015 | West |
| 2015/0155823 A1 | 6/2015 | West et al. |
| 2015/0168021 A1 | 6/2015 | Wentworth et al. |
| 2015/0180405 A1 | 6/2015 | West et al. |
| 2015/0200618 A9 | 7/2015 | West et al. |
| 2015/0204372 A1 | 7/2015 | West et al. |
| 2015/0218822 A1 | 8/2015 | Blazley |
| 2015/0222221 A1 | 8/2015 | West |
| 2015/0222222 A1 | 8/2015 | West |
| 2015/0222225 A1 | 8/2015 | Danning |
| 2015/0249423 A1 | 9/2015 | Braunstein et al. |
| 2015/0280639 A1 | 10/2015 | Atchley et al. |
| 2015/0288320 A1 | 10/2015 | Stearns et al. |
| 2015/0303865 A1 | 10/2015 | West et al. |
| 2015/0316292 A1 | 11/2015 | West |
| 2016/0069592 A1 | 3/2016 | Giraudo |
| 2016/0111995 A1 | 4/2016 | Nayar |
| 2016/0111996 A1 | 4/2016 | Stephan |
| 2016/0111999 A1 | 4/2016 | Stapleton |
| 2016/0285408 A1 | 9/2016 | Ash |
| 2016/0308487 A1 | 10/2016 | Molina |
| 2017/0063300 A1 | 3/2017 | Ash |
| 2017/0302222 A1 | 10/2017 | Aliabadi |

FOREIGN PATENT DOCUMENTS

| | | |
|---|---|---|
| DE | 102005039495 | 3/2007 |
| DE | 102005059487 | 7/2007 |
| DE | 102006022870 | 9/2007 |
| DE | 102007026819 | 12/2007 |
| DE | 102008000293 | 8/2009 |
| DE | 102008012717 | 9/2009 |
| JP | H08296311 | 11/1996 |
| JP | 2642606 | 8/1997 |
| JP | 2931240 | 8/1999 |
| JP | 2972761 | 11/1999 |
| JP | 3041279 | 5/2000 |
| JP | 2000345664 | 12/2000 |
| JP | 2004060358 | 2/2004 |
| JP | 4041805 | 2/2008 |
| JP | 2008127866 | 6/2008 |
| JP | 4382143 | 12/2009 |
| JP | 2010209515 | 12/2009 |
| JP | 2010242367 | 10/2010 |
| JP | 2011006864 | 1/2011 |
| JP | 2011106188 | 6/2011 |
| WO | 2007093421 | 8/2007 |
| WO | 2012125327 | 9/2012 |
| WO | 2013009375 | 1/2013 |
| WO | 2013043816 | 3/2013 |
| WO | 2015020817 | 2/2015 |
| WO | 2015023526 | 2/2015 |
| WO | 2015039007 | 3/2015 |
| WO | 2015042260 | 3/2015 |
| WO | 2015112461 | 7/2015 |
| WO | 2015160644 | 10/2015 |
| WO | 2015183971 | 12/2015 |

OTHER PUBLICATIONS

Office Action from the United States Patent Office for U.S. Appl. No. 15/934,749 dated Oct. 15, 2018 (8 pages).
Office Action from the United States Patent Office for U.S. Appl. No. 15/934,749 dated Mar. 11, 2019 (8 pages).
Notice of Allowance from the United States Patent Office for U.S. Appl. No. 15/934,749 dated Jul. 2, 2019 (5 pages).
Non-Final Office Action from the United States Patent Office for U.S. Appl. No. 14/928,235 dated Mar. 1, 2016 (6 pages).
Notice of Allowance from the United States Patent Office for U.S. Appl. No. 14/928,235 dated May 5, 2016 (8 pages).
Non-Final Office Action from the United States Patent Office for U.S. Appl. No. 14/680,226 dated Jan. 15, 2016 (9 pages).
Non-Final Office Action from the United States Patent Office for U.S. Appl. No. 14/680,226 dated Jun. 14, 2016 (10 pages).
Final Office Action from the United States Patent Office for U.S. Appl. No. 14/680,226 dated Dec. 15, 2016 (12 pages).
Non-Final Office Action from the United States Patent Office for U.S. Appl. No. 15/286,000 dated Aug. 18, 2017 (11 pages).
Final Office Action from the United States Patent Office for U.S. Appl. No. 15/286,000 dated Oct. 30, 2017 (10 pages).
Non-Final Office Action from the United States Patent Office for U.S. Appl. No. 15/236,175 dated Aug. 15, 2017 (11 pages).
Final Office Action from the United States Patent Office for U.S. Appl. No. 15/236,175 dated Dec. 12, 2017 (9 pages).
Notice of Allowance from the United States Patent Office for U.S. Appl. No. 15/236,175 dated Mar. 2, 2018 (8 pages).
Notice of Allowance from the United States Patent Office for U.S. Appl. No. 14/680,226 dated Jan. 24, 2018 (7 pages).
Notice of Allowance from the United States Patent Office for U.S. Appl. No. 14/680,226 dated Mar. 19, 2018 (4 pages).
Non-final Office Action from the United States Patent Office for U.S. Appl. No. 15/286,000 dated Mar. 2, 2018 (9 pages).
U.S. Appl. No. 61/195,780, filed Oct. 11, 2008.
U.S. Appl. No. 61/208,323, filed Feb. 23, 2009.
U.S. Appl. No. 61/214,857, filed Apr. 28, 2009.
Non-final Office Action from the United States Patent Office for U.S. Appl. No. 16/673,433 dated Feb. 17, 2021 (9 pages).
Notice of Allowance from the United States Patent Office for U.S. Appl. No. 16/673,433 dated Jun. 3, 2021 (5 pages).

ROOF MOUNTING SYSTEM

CROSS REFERENCE TO RELATED APPLICATIONS

The present application is a continuation of U.S. Ser. No. 16/673,433, entitled ROOF MOUNTING SYSTEM and issued as U.S. Pat. No. 11,121,669, which is a continuation of U.S. Ser. No. 15/934,749 (the '749 application), entitled ROOF MOUNTING SYSTEM and issued as U.S. Pat. No. 10,469,023, the '749 application claims priority to and the benefit of U.S. Provisional Patent Application Nos. 62/475,684, filed Mar. 23, 2017 and entitled STANDING SEAM ROOF MOUNT SYSTEM, the '749 application is also a continuation in part of and claims priority to and the benefit of U.S. Ser. No. 15/701,378 filed on Sep. 11, 2017 and entitled ROOF MOUNTING SYSTEM which claims priority to and the benefit of Provisional Patent Application No. 62/393,565, filed Sep. 12, 2016 and entitled ROOF MOUNT SYSTEM, the entire contents of each of the preceding filings are herein incorporated by reference for any purpose.

FIELD

The present disclosure relates to solar panel mounting systems and more specifically to mounting systems for various roof types.

SUMMARY

In various embodiments, a roof mounting system may comprise a short base, a tall base, a first clamp assembly and a second clamp assembly. The short base may have a first body and a first slot. The first slot may be formed on the first body at an angle. The tall base may have a second body and a second slot. The second slot may be formed on the second body at the angle. The first clamp assembly may be configured to be operatively couple to the first slot. The second clamp assembly may be configured to be operatively couple to the second slot. The first clamp and the second clamp may be configured to engage and retain a solar panel on the short base and the tall base at the angle.

In various embodiments, the support fastener may be installable in the first slot or the second slot. The support fastener may be configured to support the first clamp or the second clamp.

In various embodiments, the first clamp assembly may comprise a threaded shaft that are installable in the first slot. The first clamp assembly may include a level nut and a support plate. The level nut and support plate may be adjustably installable on the threaded shaft and configured to support a solar panel.

In various embodiments, the first clamp assembly and/or the second clamp assembly may comprise a spacer block that is configured to support a clamp. The spacer block may be installed with the first clamp assembly or the second clamp assembly where the first clamp assembly or the second clamp assembly supports the end of an array or is configured as an end clamp.

In various embodiments, each clamp assembly may comprise a clamp. Each clamp may comprise, include, or be configured with a pin or a tooth. The pin or tooth may be configured to create an electrically conductive path between the clamp and the solar panel. The clamp may be configured with the tooth where the clamp is made of stainless steel. The clamp may include the pin where the clamp is made of aluminum.

In various embodiments, the mounting system may comprise a spacer. The spacer may be configured to mount to at least one of the first slot and the second slot. The spacer may be used to provide additional height for the mounting system. In this regard, the spacer may be configured to mount a solar panel array over roof obstructions, such as, for example, vent pipes, chimneys, whirly birds, and/or the like.

In various embodiments, the second body of the tall base may include a cross support. The second body may also define a first hollow and a second hollow. The cross support may be disposed between the first hollow and the second hollow.

In various embodiments, the mounting systems described herein may also be configured to mount a solar panel array to standing seam metal roof. The mounting system described herein may be configured as a rail-less standing seam roof mounting system.

In various embodiments, a roof mount block may comprise a body, a first fastener, a second fastener and a mid-clamp. The body may include a bearing surface. The body may also define an attachment channel (e.g., a U-channel) and/or a slot (e.g., a t-slot). The attachment channel may be configured to mount on and/or attached to a stand seam or a standing seam metal roof. The attachment channel may be disposed below the slot. In this regard, the attachment channel and the slot may be substantially parallel to one another. The slot may be at least partially defined through the bearing surface. The slot may also be configured to receive a first fastener (e.g., a bolt, t-bolt, t-nut and threaded rod, and/or the like). The second fastener installable through a portion of the body. The second fastener may be, for example, a set screw. The second fastener may protrude into the attachment channel in response being installed in the body. In this regard, the second fastener may contact, clamp, pinch, or otherwise engage the standing seam of a standing seam metal roof in the attachment channel. The mid-clamp may be slidably coupled to the body along the slot with the first fastener.

In various embodiments, the first fastener is an assembly. The assembly includes a t-nut and a fastener. In various embodiments, the bearing surface may include a plurality of serrations defined in the bearing surface. In various embodiments, an engagement tooth may be formed along the length of the slot.

In various embodiments, a roof mount block may comprise a body, a t-mount, a fastener and a carriage. The body may define an attachment channel. The t-mount may be operatively coupled to and/or integrally formed on the body. The t-mount may be configured to be operatively couple to the carriage. The fastener may be installable through a portion of the body. In this regard, the fastener may protrude into the attachment channel in response being installed in the body.

In various embodiments, the mid clamp may comprise a spacer block that is configured to support at least a portion of the clamp (e.g., half the clamp). The spacer may be installed in a mid-clamp on the end of an array. In this regard, the spacer may allow the mid clamp to function as an end clamp. Moreover, the spacer may be configured and/or sized to replicate the thickness of a solar module.

In various embodiments, each mid clamp assembly may be a clamp assembly. Each clamp assembly may comprise, include, or be configured with a clamp and a pin or a tooth. The pin or tooth may be configured to create an electrically conductive path between the clamp and the solar panel. The clamp may be configured with the tooth where the clamp is made of stainless steel. The clamp may include the pin where the clamp is made of aluminum.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
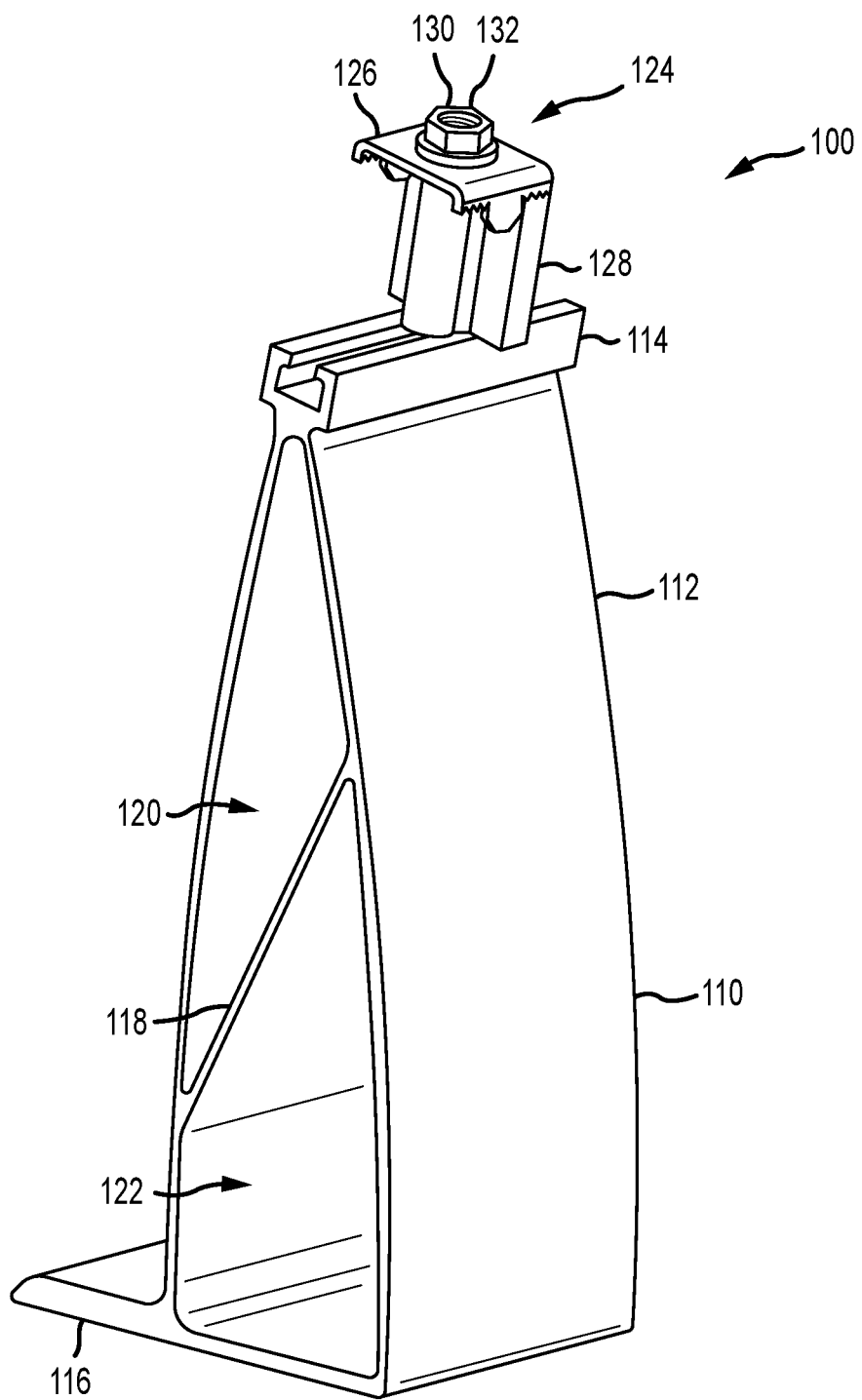
FIGS. 1A-1D illustrate various perspective views of a mounting systems and components for a first attachment point, in accordance with various embodiments.
Figure 1B:
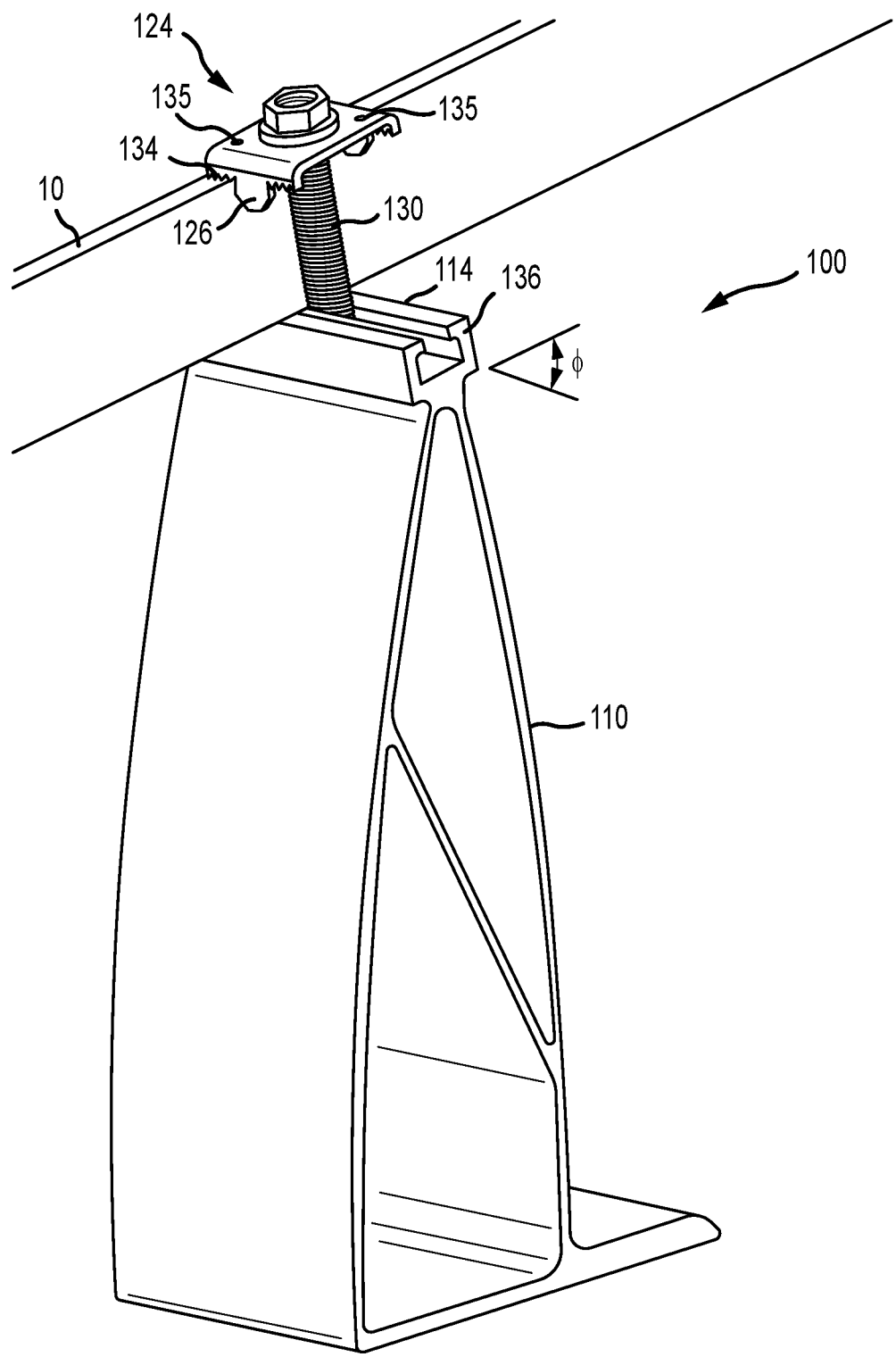
Figure 1C:
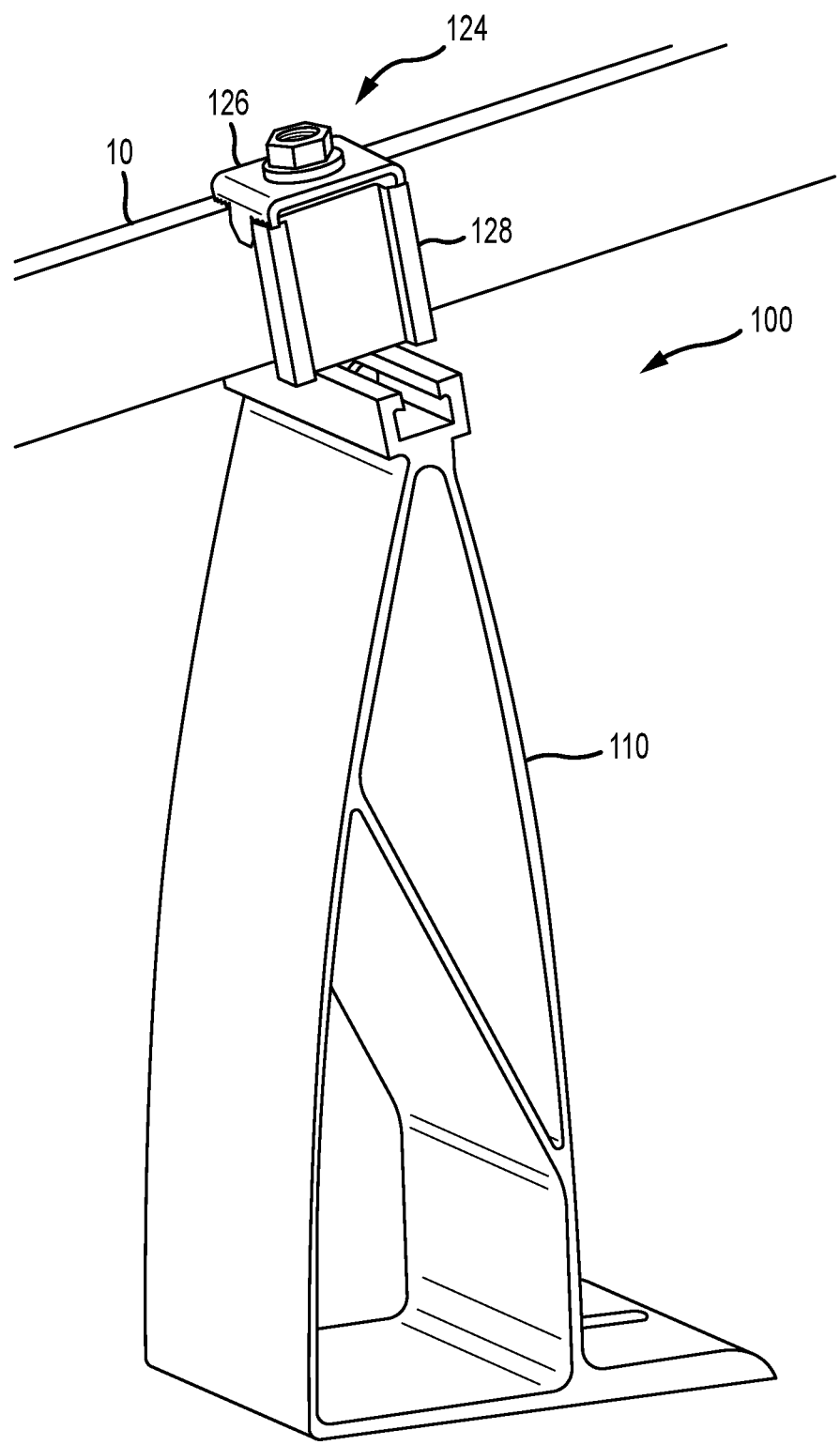
Figure 1D:
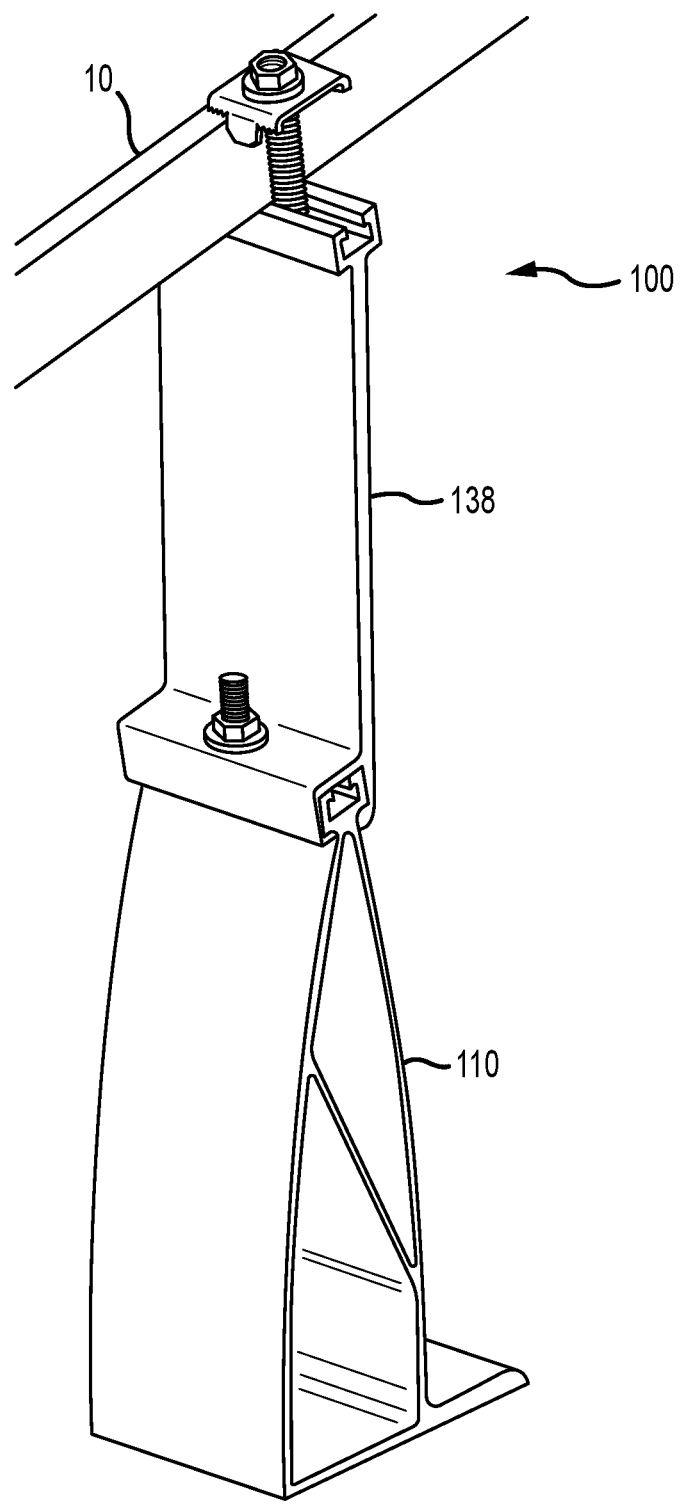
Figure 2A:
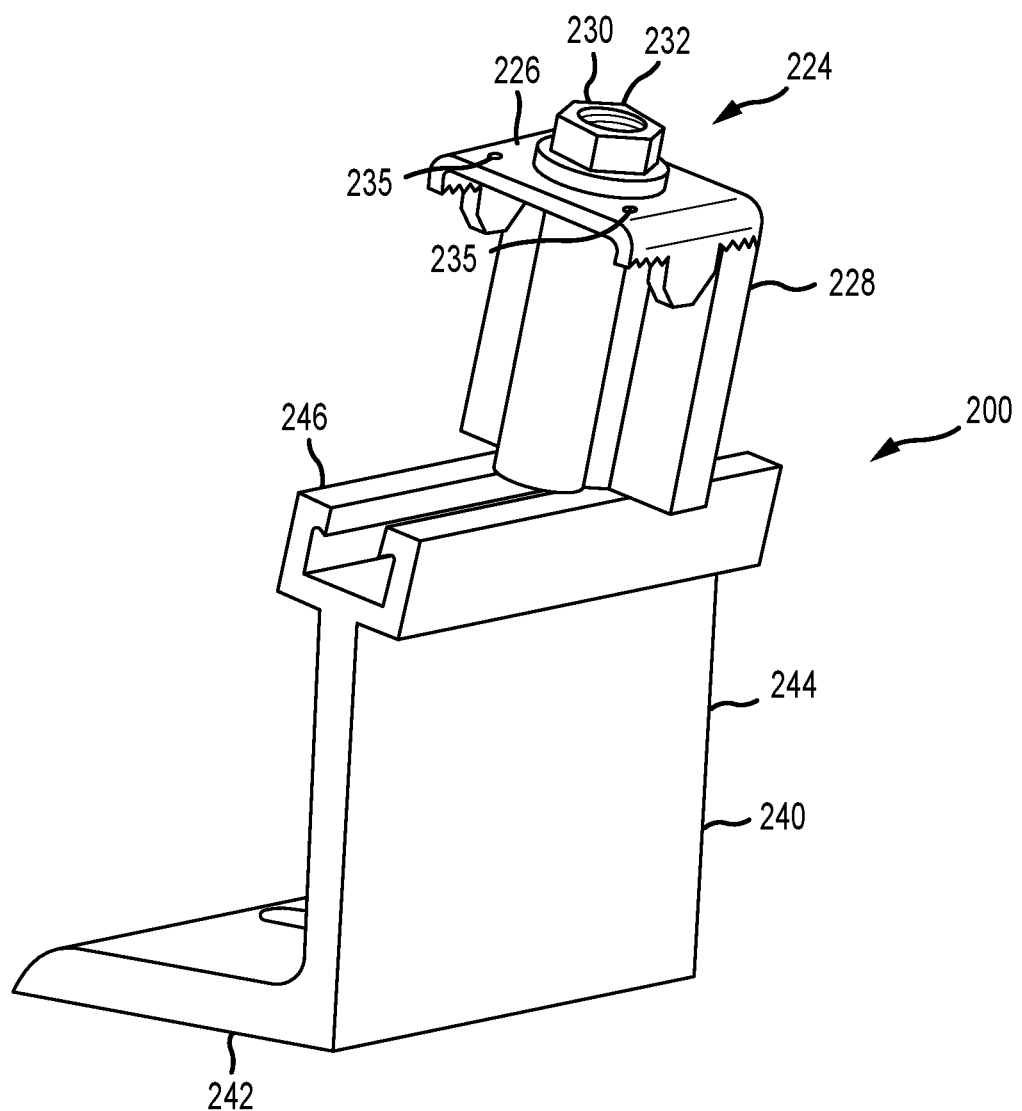
FIGS. 2A-2F illustrate various perspective views of a mounting systems and components for a second attachment point, in accordance with various embodiments.
Figure 2B:
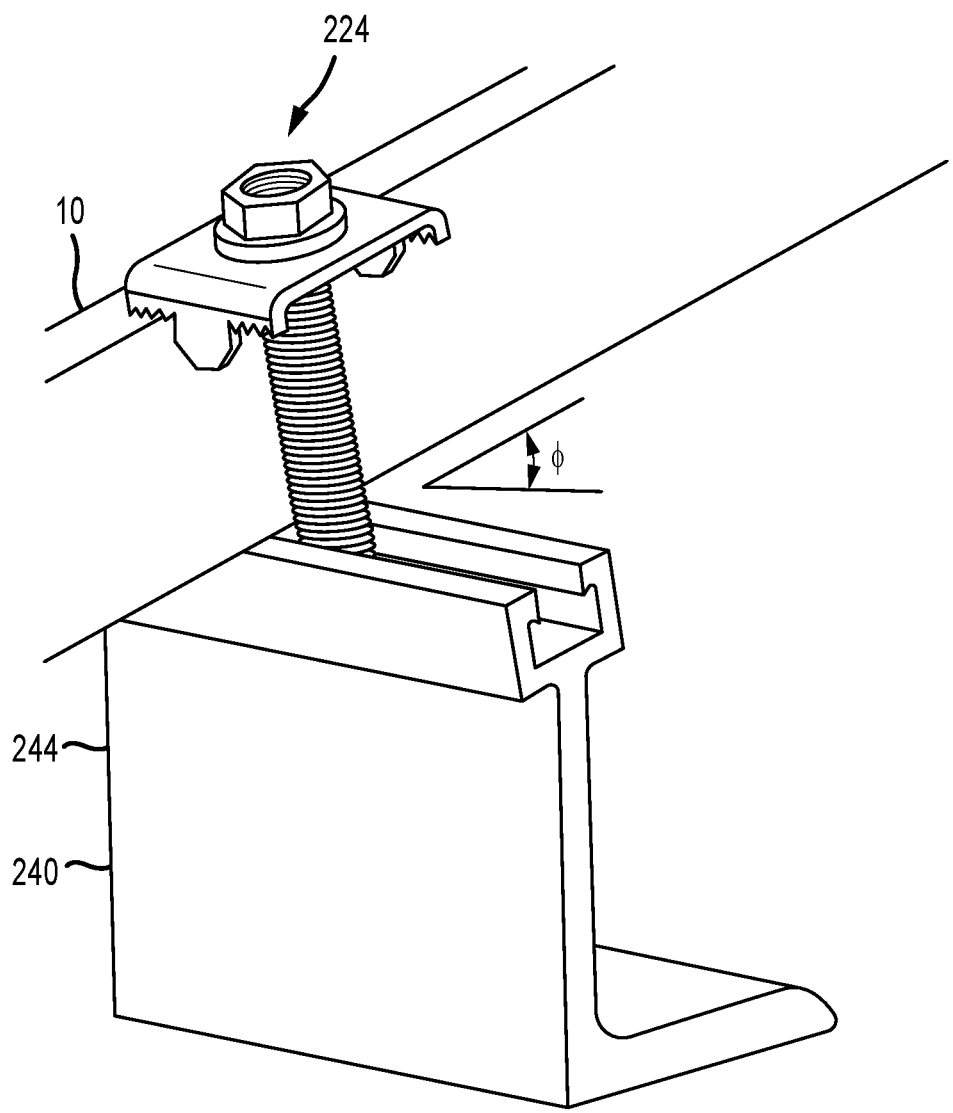
Figure 2C:
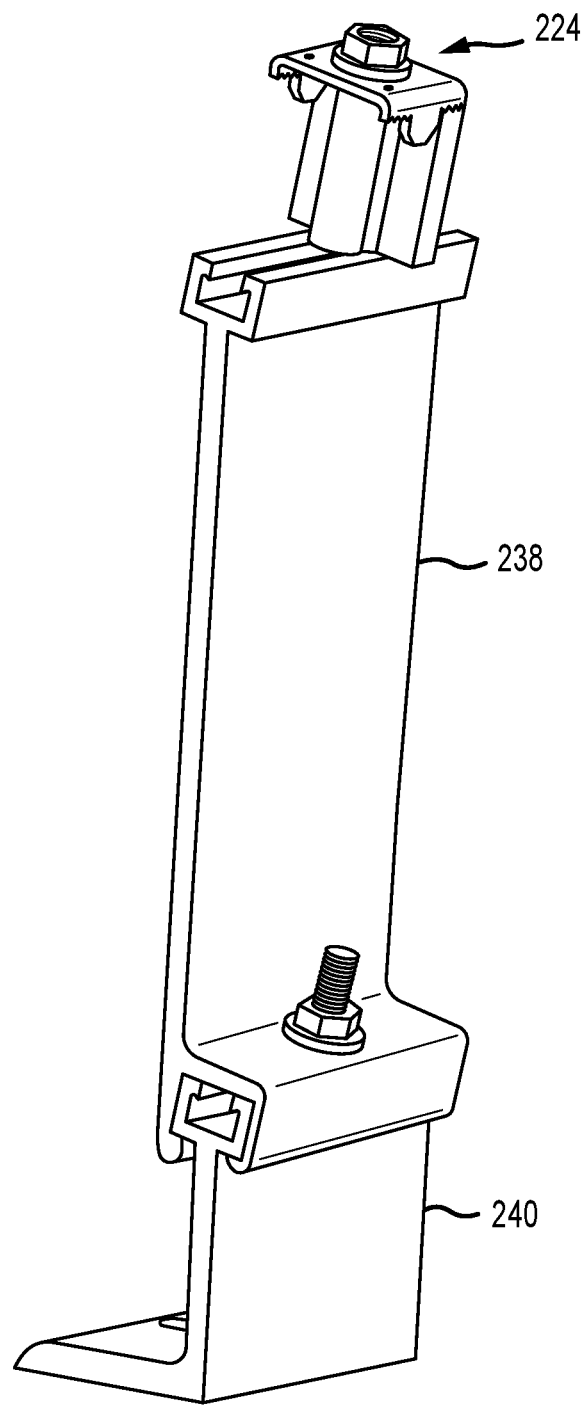
Figure 2D:
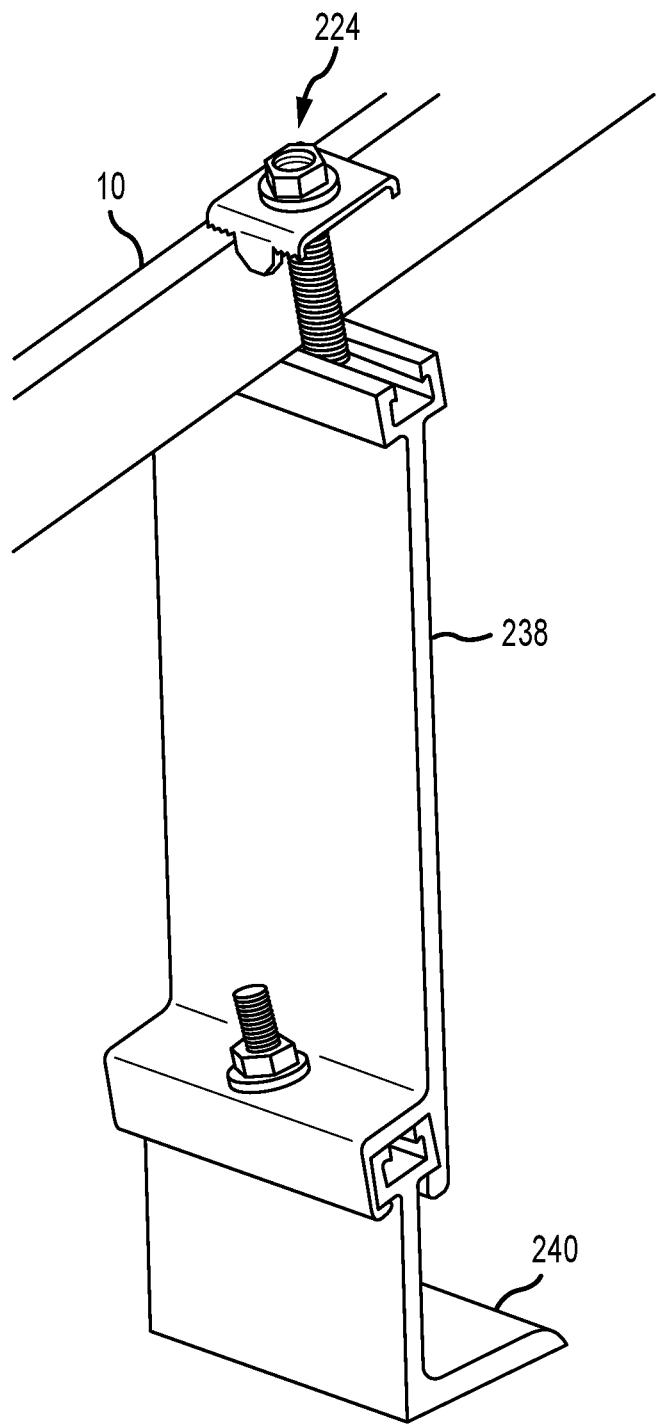
Figure 2E:
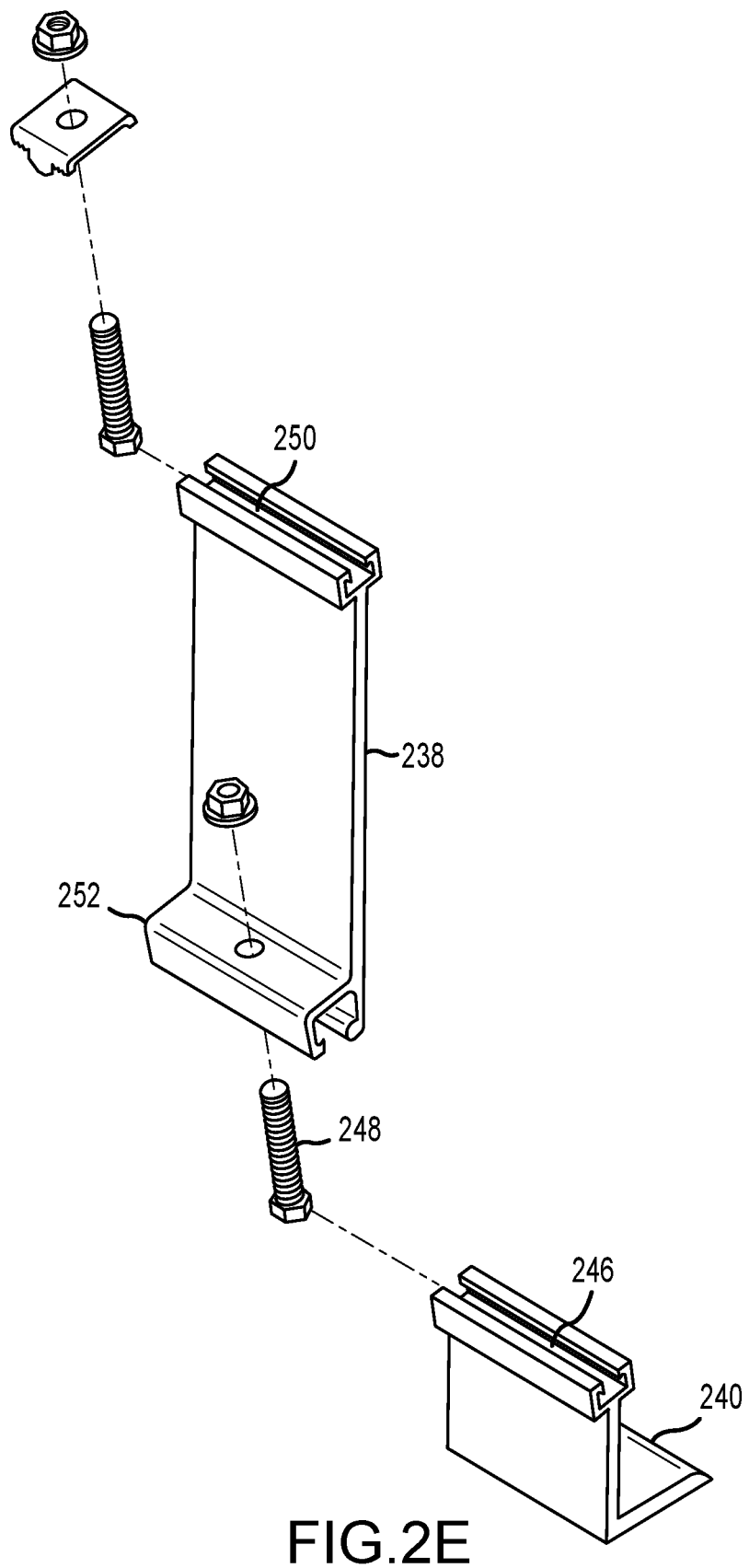
Figure 2F:
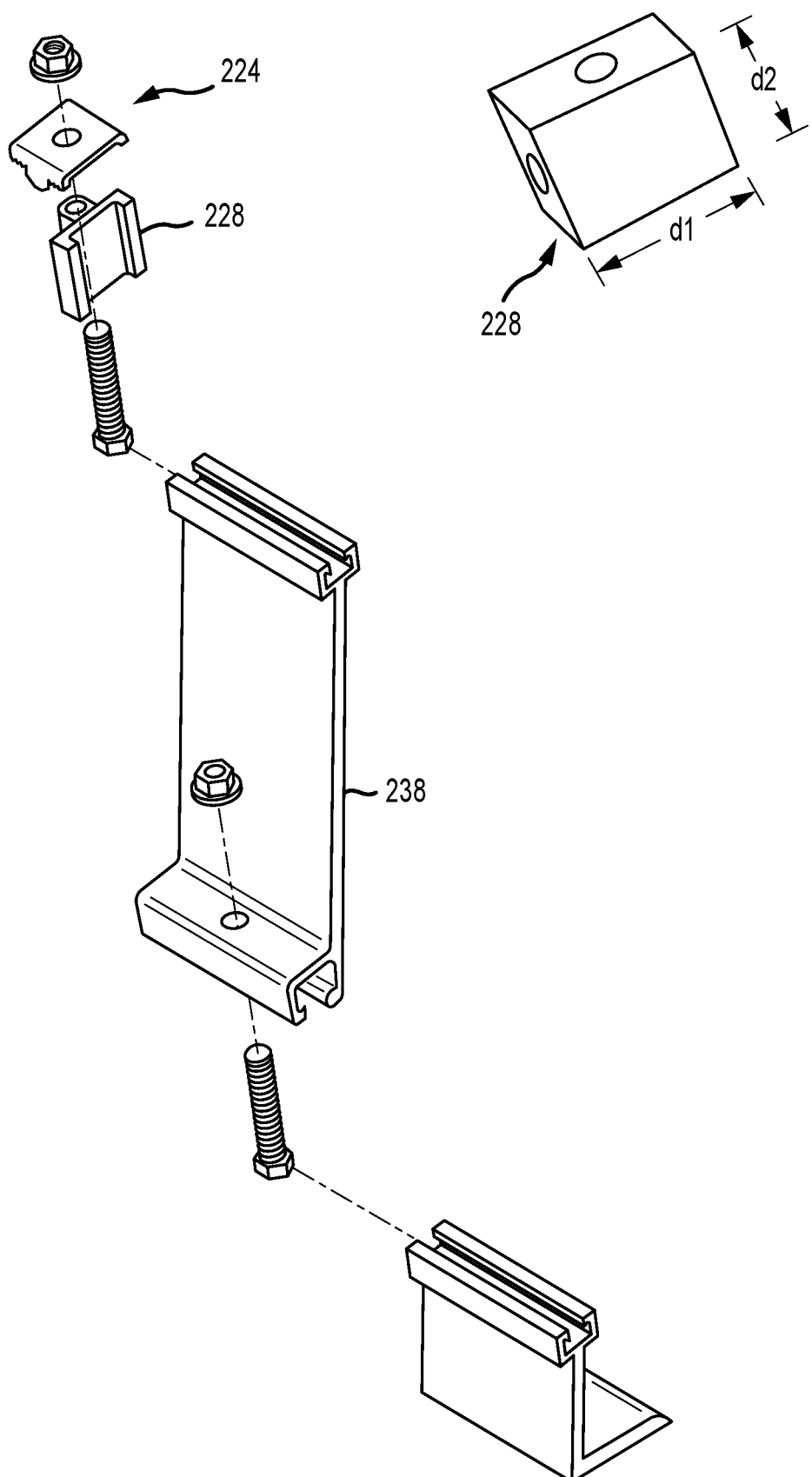

The detailed description of exemplary embodiments herein refers to the accompanying drawings, which show exemplary embodiments by way of illustration. While these exemplary embodiments are described in sufficient detail to enable those skilled in the art to practice the inventions, other embodiments may be realized, and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, the roof mounting systems may be configured for securing a solar panel array to a roof. The systems may be configured to mount solar panels to various roof types. The systems may be configured to mount the panels at an angle about the roof surface. The systems may be configured to mount the panels substantially parallel to the roof surface. The system may include an integrated electrical bonding system that is compliant with the building codes and safety standards, including, for example, UL 2703, First Edition or any other similar specification related to solar panel racking and/or mounting hardware.

In various embodiments, the mounting systems described herein may be configured to mount a solar panel array to a flat concrete roof like those found throughout the Caribbean and Central and South America. Other systems described herein may be configured to facilitate mounting structures on standing seam metals roofs. Still other systems described herein may be configured to facilitate mounting structures on composite shingle, slate, or tile roofs. The mounting systems described herein may be configured as rail-less or rails free roof mounting systems.

In various embodiments, a roof mounting system may comprise a short base, a tall base, a first clamp assembly and a second clamp assembly. The short base may have a first body and a first slot. The first slot may be formed on the first body at an angle. The tall base may have a second body and a second slot. The second slot may be formed on the second body at the angle. The first clamp assembly may be configured to be operatively couple to the first slot. The second clamp assembly may be configured to be operatively couple to the second slot. The first clamp and the second clamp may be configured to engage and retain a solar panel on the short base and the tall base at the angle.

In various embodiments and with reference to FIGS. 1A-1D, solar panel support system 100 may be configured to attach a solar panel to a roof. System 100 may comprise a tall base 110. Tall base 110 may include a body 112, an attachment point 114, a foot 116, and a cross support 118. Attachment point 114 may be formed in or operatively coupled to the top of body 112. Foot 116 may be formed in or operatively coupled to the bottom for body 112. Cross support 118 may divide a hollow defined by body 112. In this regard, body 112 and cross support 118 may define a first hollow 120 and a second hollow 122. Cross support 118 may also be configured to strengthen body 112.

In various embodiments, system 100 may comprise clamp assembly 124. Clamp assembly 124 may be mounted to body 112 via attachment point 114. Clamp assembly 124 may comprise clamp 126, fastener 130 and nut 132. Clamp assembly 124 may also comprise a spacer block 128. Spacer block 128 may be optionally installed at the end of column of panels in an array. In this regard, spacer bock 128 may simulate the frame of a solar module so that clamp assembly 124 properly engages and retains the module at the end of the array. Spacer block 128 may be any suitable size. For example, spacer block 128 may be installable in two or more orientations. In this regard, spacer block 128 may be configured to provide various heights that replicate the various thicknesses of solar panel frames (e.g., 32 mm, 33 mm, 35, mm, 38 mm, 40 mm, 45 mm, 50 mm and/or any other suitable height).

In various embodiments, attachment point 114 may comprise one or more points 136. Fastener 130 may be configured to contact and/or deform a portion of point 136. In this regard, fastener 130 may create an electrically conductive path (e.g., a bond path as required by UL 2703 or a similar standard). between attachment point 114—tall base 110. Moreover, clamp assembly 124 may be configured to create an electrically conductive path (e.g., a bond path as described herein) from solar panel 10, through clamp assembly 124 and to tall base 110. Clamp 126 may be stainless steel. Clamp 126 may also comprise one or more pins 135. In this regard, pin 135 may be configured to create an electrically conductive path between solar panel 10 and clamp assembly 124.

In various embodiments, clamp assembly 124 may be configured to retain solar panel 10 on tall base 110 at an angle θ. θ may likely be between approximately 7 degrees to 25 degrees. More particularly, θ may be 10 degrees, 15 degrees, 20 degrees, and/or the like.

In various embodiments, spacer 138 may be installed on tall base 110. Spacer 138 may provide flexibility for installation of an array around roof structures (e.g., vents, chimneys, antennas, and/or the like). Spacer 138 may also allow a user to adjust the installation angle of a solar panel.

In various embodiments and with reference to FIGS. 2A-2F, solar panel support system 200 may comprise a short base 240. Short base 240 may comprise a foot 242, a body 244, and an attachment point 246 (e.g., a slot). In this regard, the attachment point 246 of short base 240 may be substantially like attachment point 114 of tall base 110. System 200 may also comprise clamp assembly 224. Clamp assembly 224 may include clamp 226, fastener 230, and nut 232. Clamp assembly 224 may also include spacer block 228. Clamp 226 may include one or more pins 233. Clamp 226 may also be made of stainless steel. As discussed herein, claim 226 and/or clamp assembly 224 may be configured to create an electrically conductive path (e.g., a bond path) between the solar panel and short base 240. Moreover, clamp assembly 224 may be used with tall base 110 or short base 240, as described herein.

In various embodiments and as described herein, short base 240 may be configured to mount one or more solar panels at an angle θ. θ may likely be between approximately 7 degrees to 25 degrees. More particularly, θ may be 10 degrees, 15 degrees, 20 degrees, and/or the like.

In various embodiments, spacer 238 may be configured to attached to short base 280. Moreover, multiple spacers 238 may be installed on one another to achieve a desired installation height.

In various embodiments, spacer block 228 may be installed with clamp assembly 224. As discussed herein, spacer block 228 may be installed at the end of an array to replicate the frame of a solar panel. Spacer block 228 may be a square or a rectangle. Spacer block 228 may include one or more hole allow for variable installation. Spacer 228 may also be a nonuniform shape that is installable on a fastener to space and support clamp 226.

Figure 3:
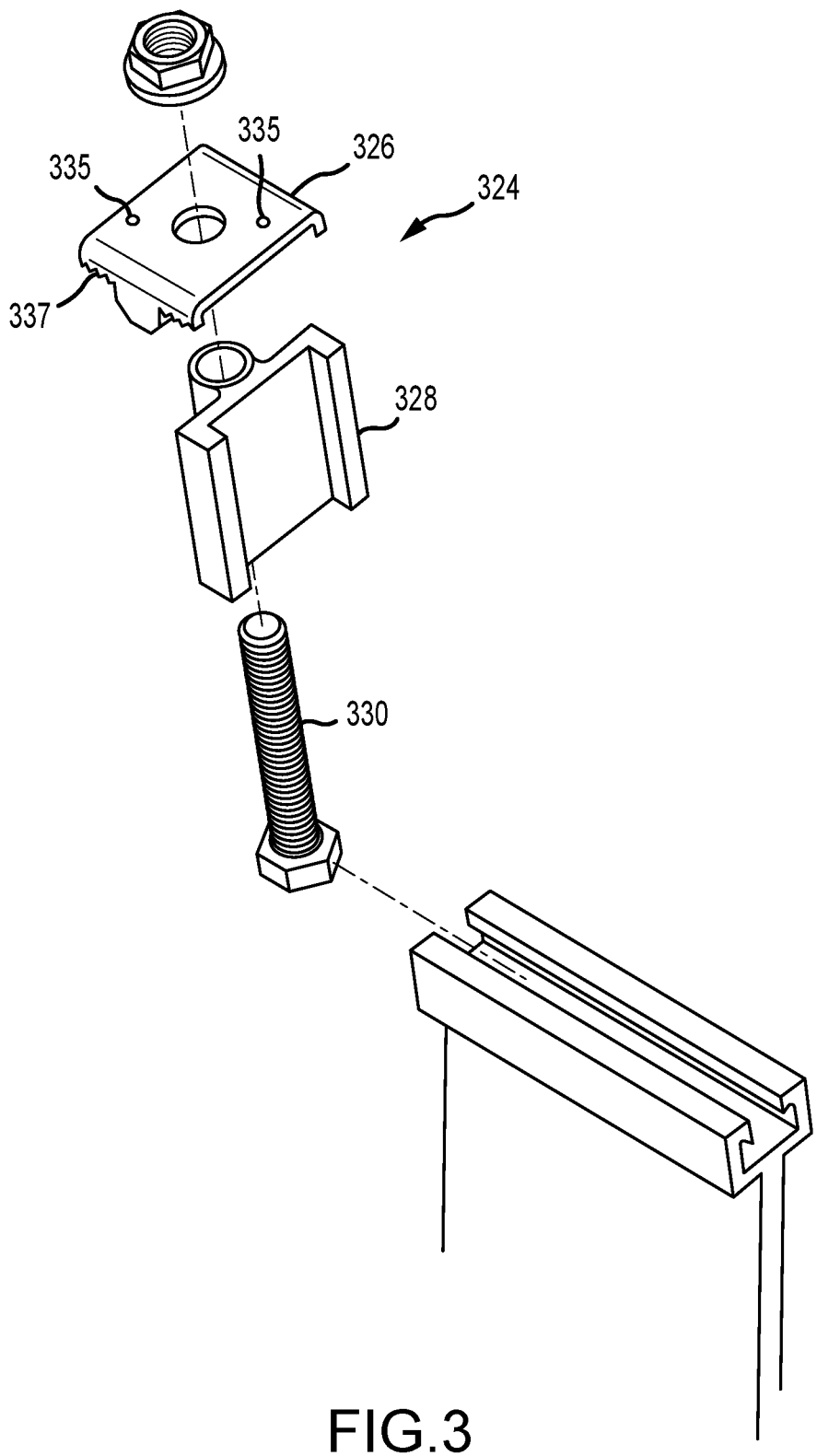
FIG. 3 illustrates an exploded perspective view of a clamp and a portion of a mounting system, in accordance with various embodiments.

In various embodiments and with reference to FIG. 3, clamp 326 may be aluminum, or a composite material. Claim 326 may include one of more conductive elements 335 (e.g., pins). Clamp 236 may also be stainless steel. In this regard, clamp 326 may be configured to carry and/or transfer electricity to other components. Clamp 326 may be part of an electrically conductive path (e.g., bond path) that electrically links all portions and/or components of the solar support system described herein. Clamp 326 may include one or more teeth or serrations 337. Tooth 337 may be configured to engage or bite into the frame of a solar panel.

Figure 4:
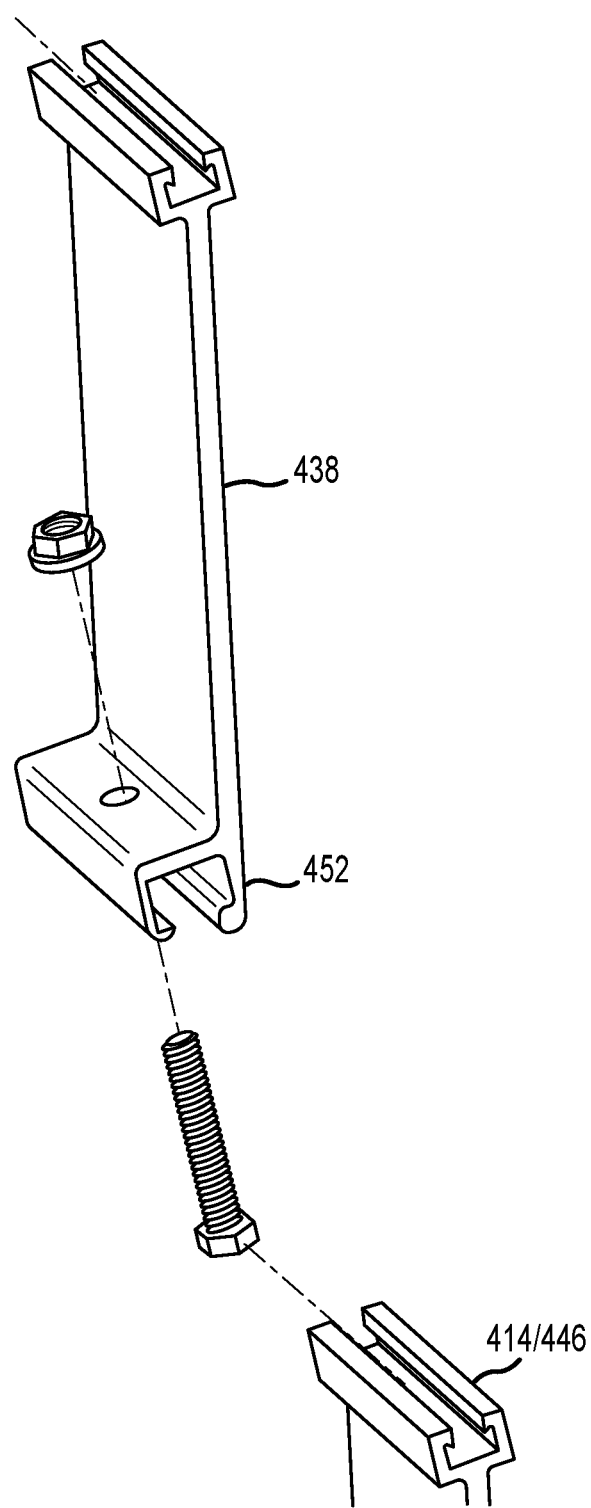
FIG. 4 illustrates an exploded perspective view of a spacer and a portion of a mounting system, in accordance with various embodiments.
Figure 5A:
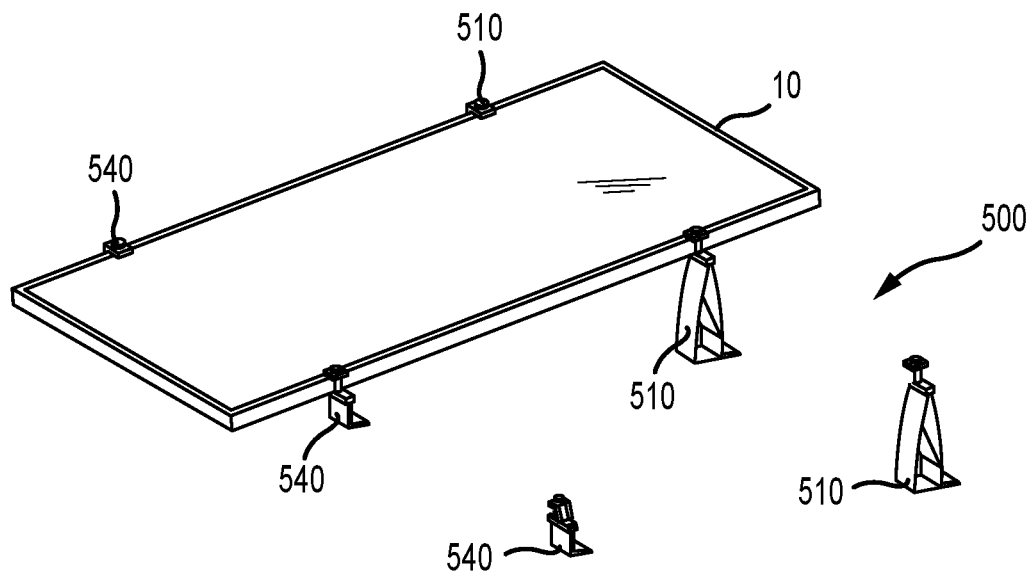
FIGS. 5A-5D illustrate various perspective views of solar panels being installed with a mounting system, in accordance with various embodiments.
Figure 5B:
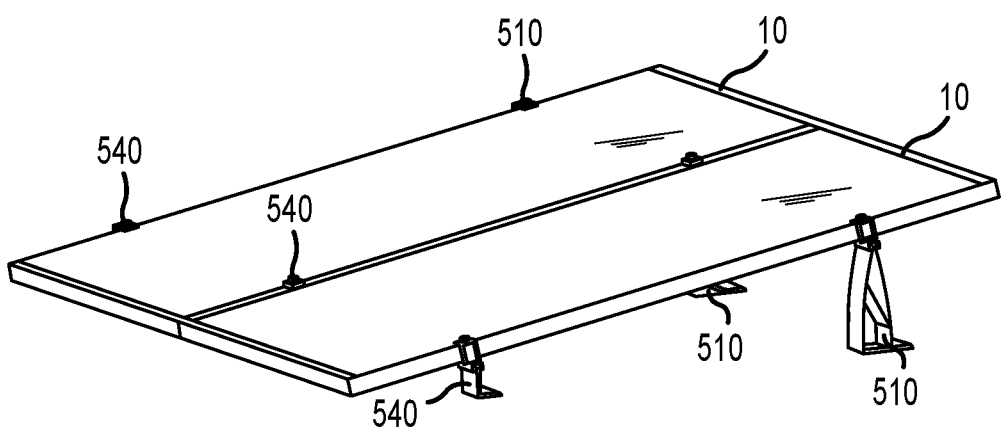
Figure 5C:
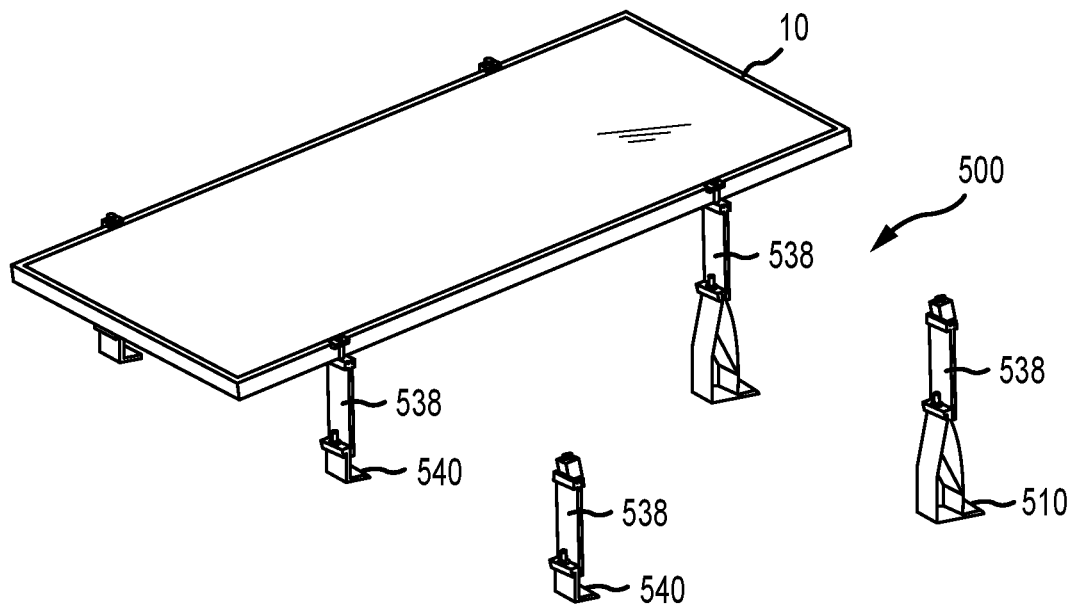
Figure 5D:
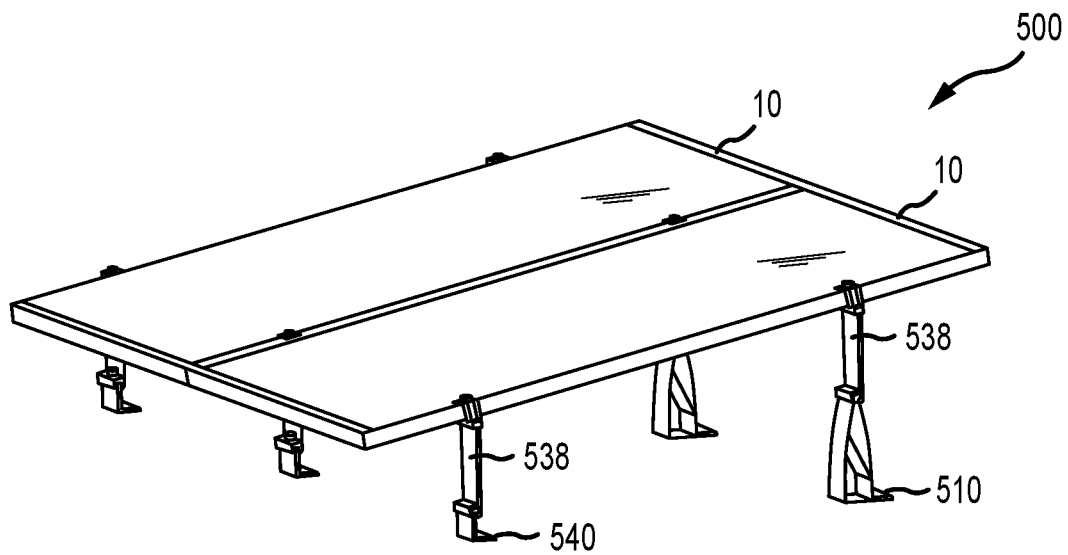
Figures 6A, 6B:
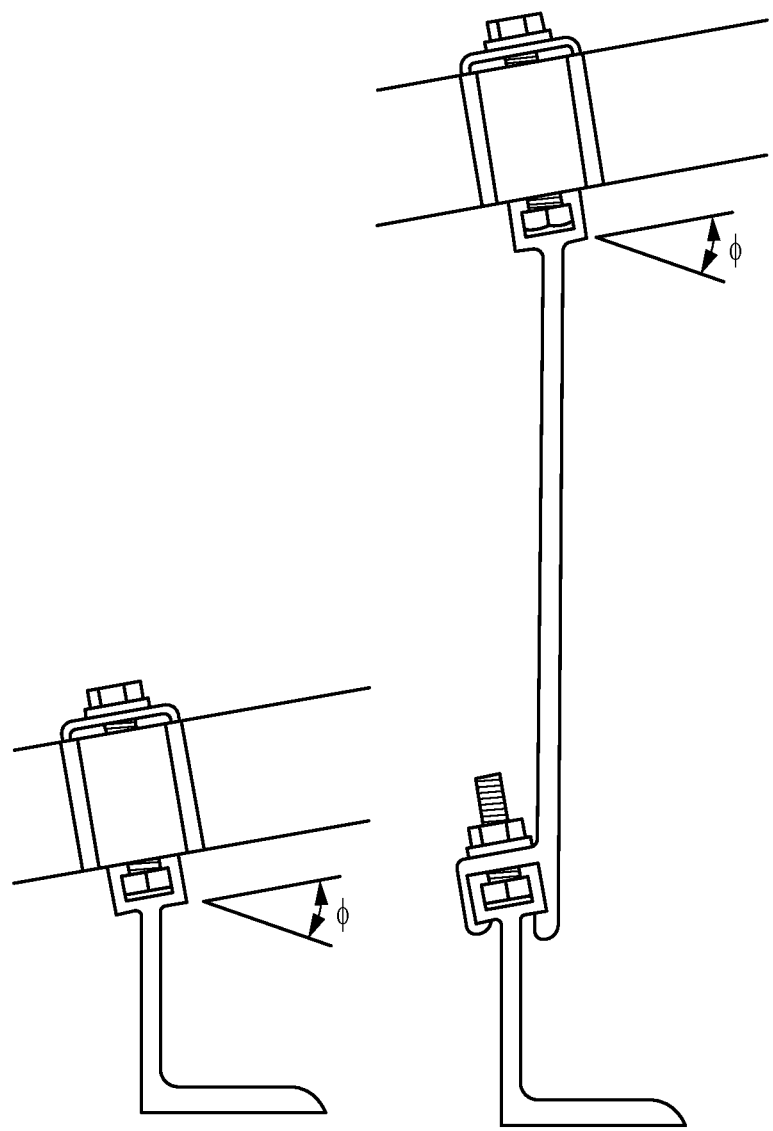
FIGS. 6A-6B illustrate side views of the installation angle of a solar panel that is installed with a mounting system, in accordance with various embodiments.
Figure 7A:
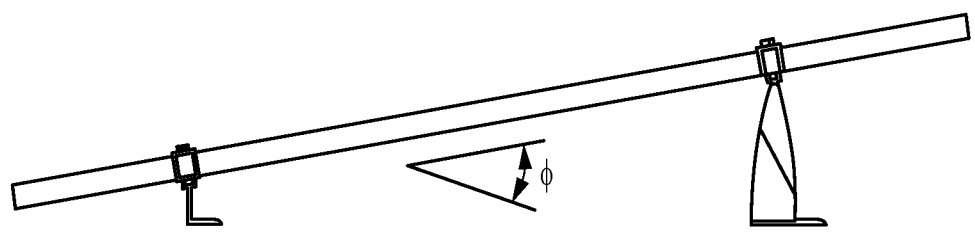
FIGS. 7A-7B illustrate side views of the installation angle of a solar panel that is installed with a mounting system, in accordance with various embodiments.
Figure 7B:
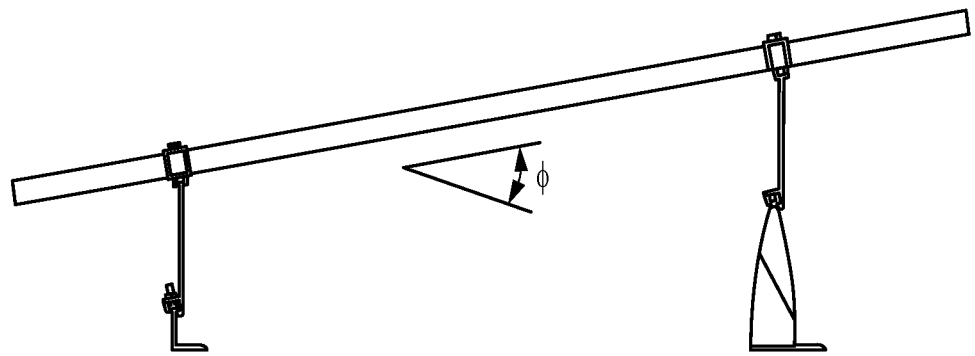
Figure 8A:
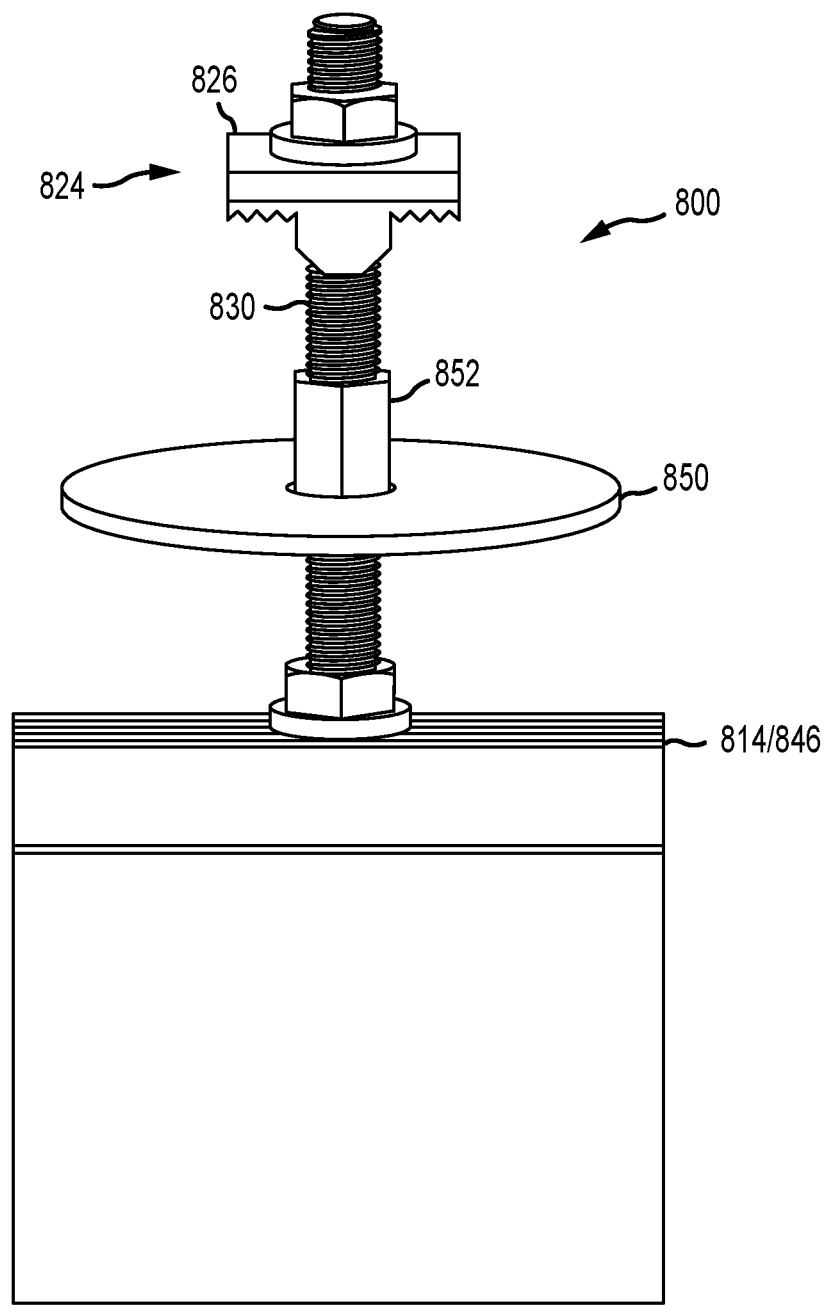
FIGS. 8A-8D illustrate views of a mounting system with height adjustment, in accordance with various embodiments.
Figure 8B:
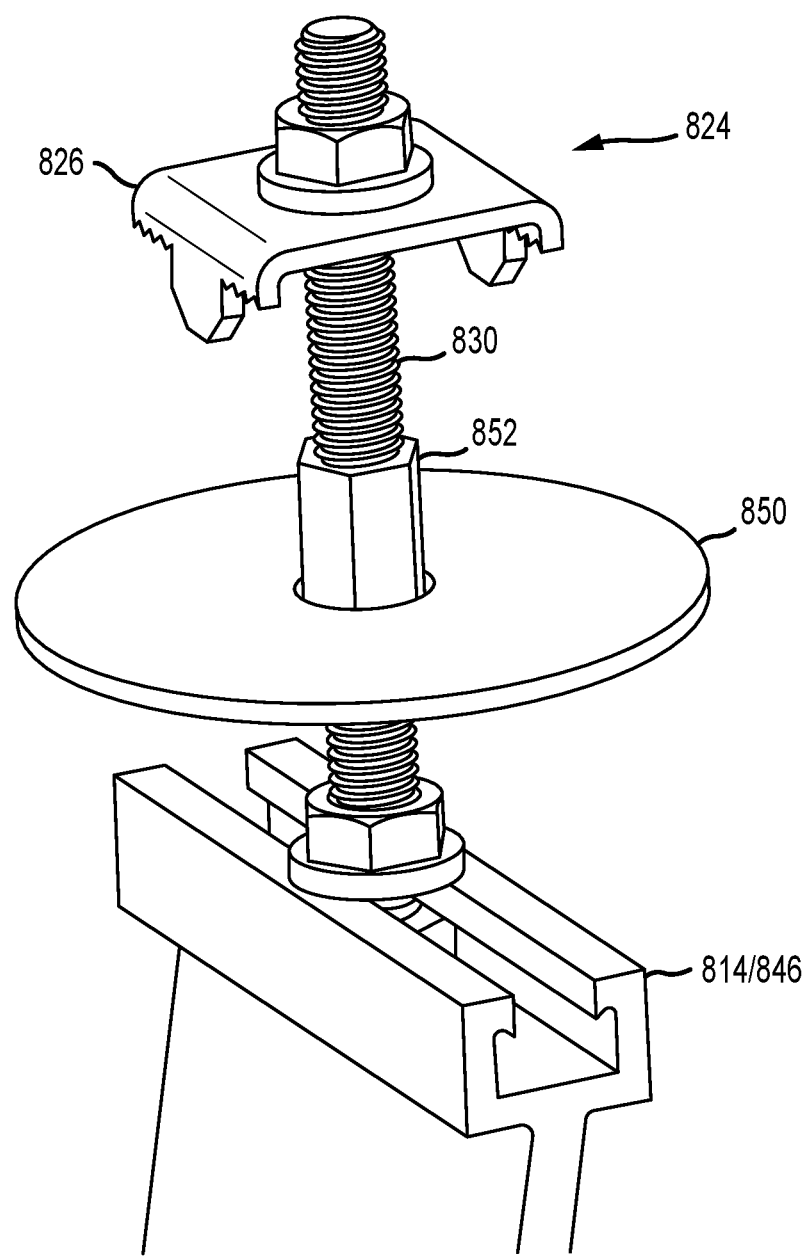
Figure 8C:
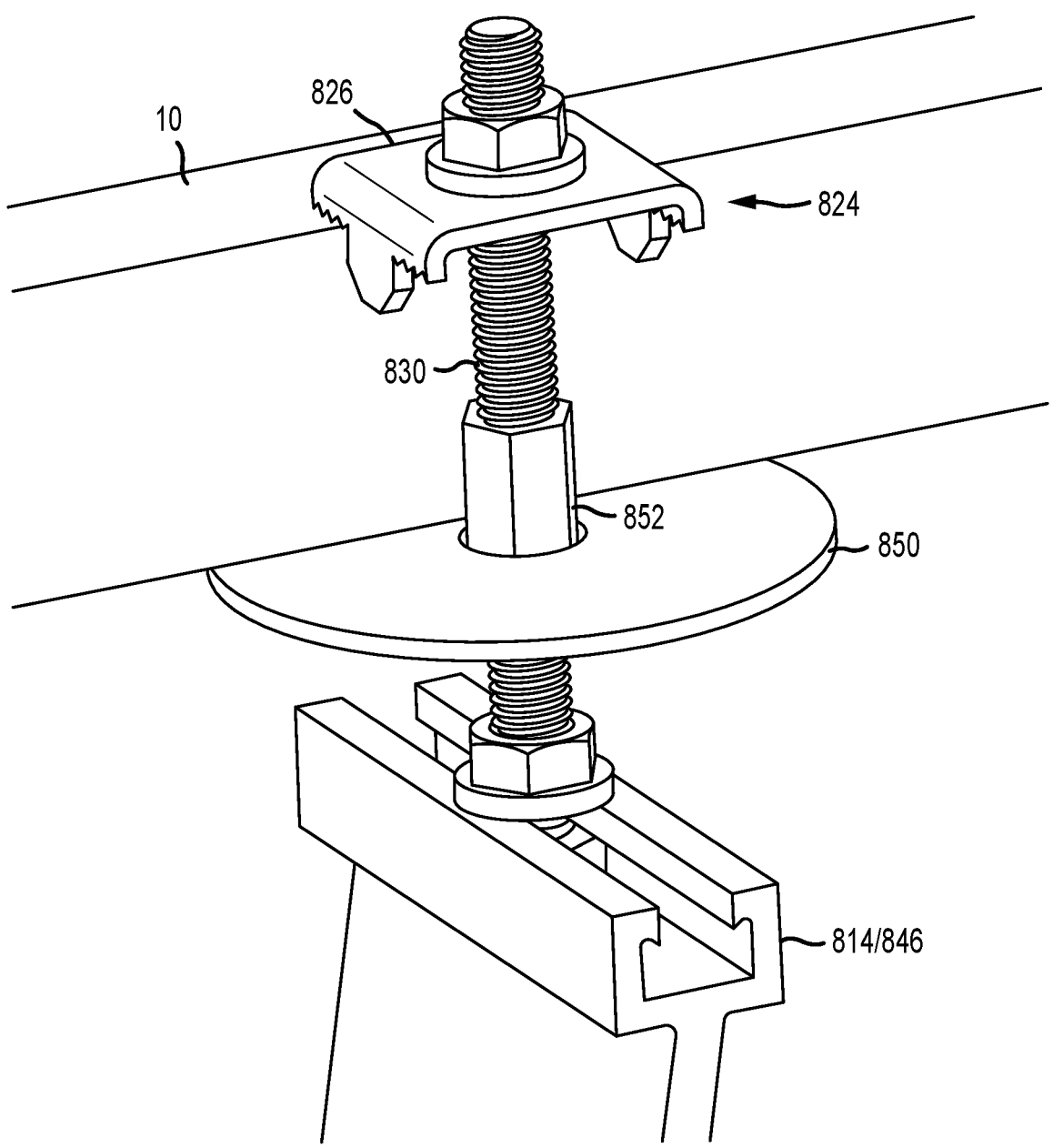
Figure 8D:
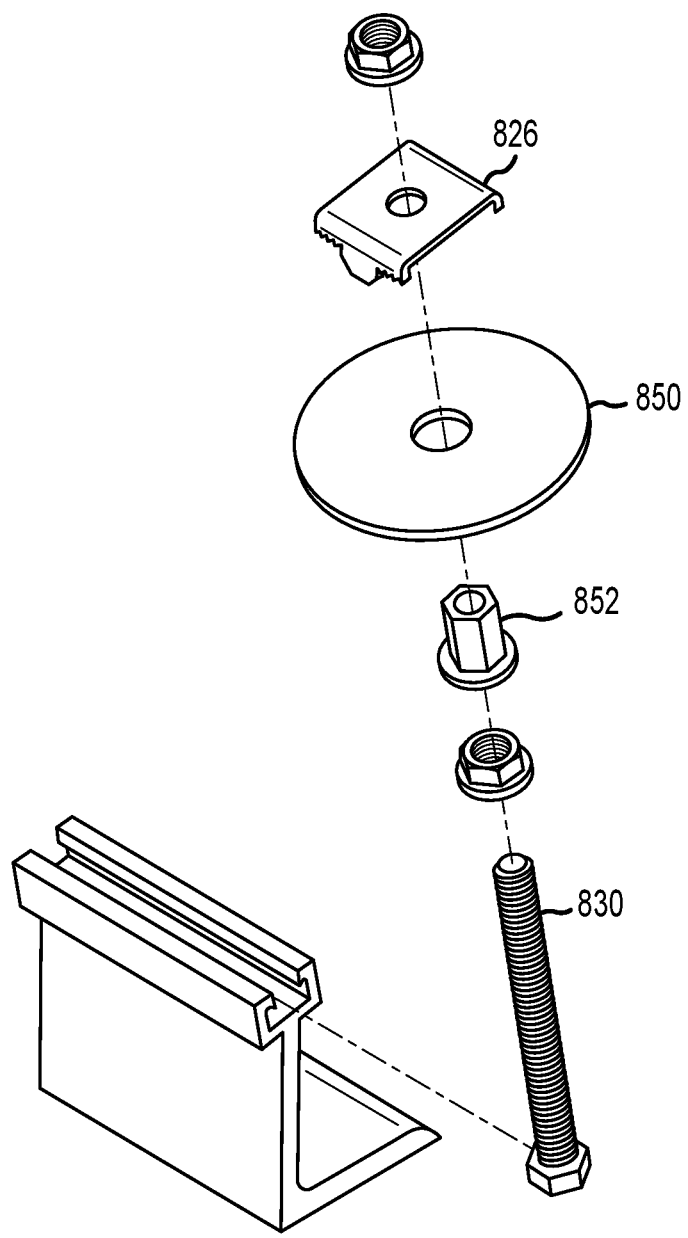
Figure 9A:
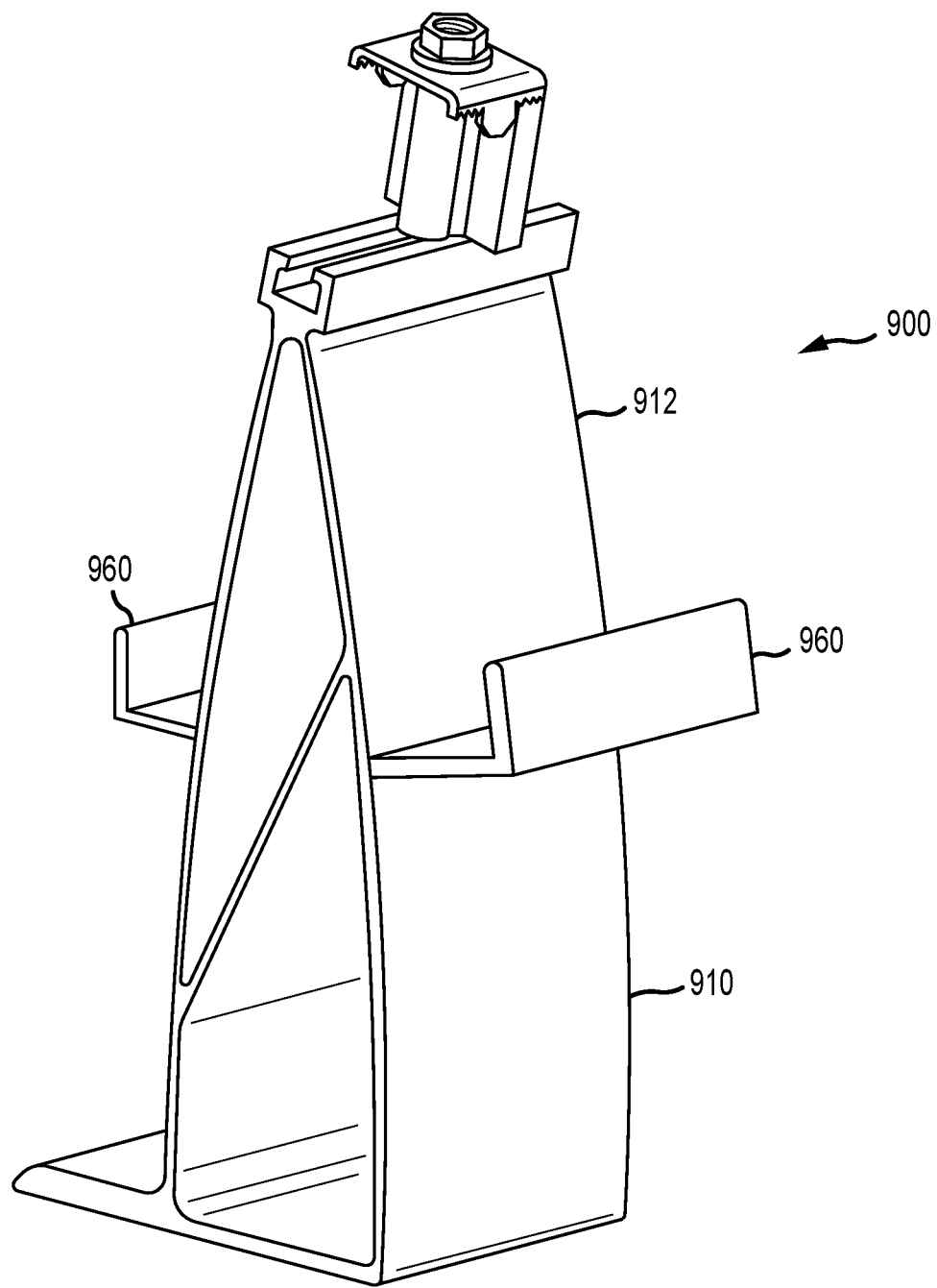
FIGS. 9A-9B illustrate views of a mounting system including hooks, in accordance with various embodiments.
Figure 9B:
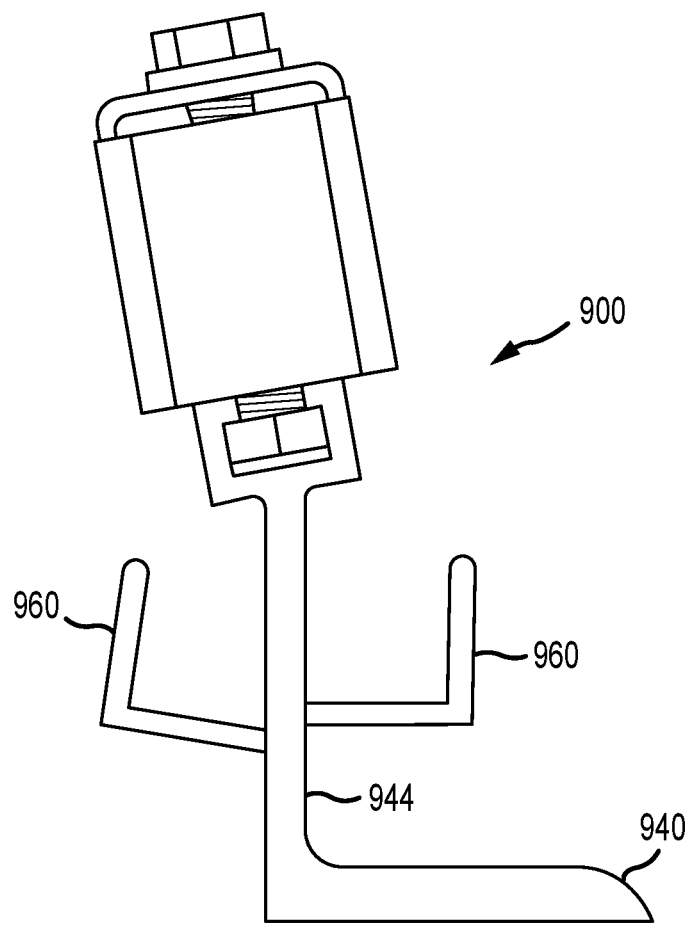

In various embodiments and with reference to FIG. 4, spacer 438 may include an attachment point 452 (e.g., a channel). Attachment point 452 may be configured to operatively couple to attachment point 114 of tall base 110. Attachment point 452 may also be configured to operatively couple to attachment point 246 of short base 240.

In various embodiments and with reference to FIGS. 5A-5D, system 500 may be configured as a rail free solar panel mounting system. In this regard, the system may be laid out with a plurality of tall brackets 510 and short brackets 540. Two solar panels 10 may be mounted on each tall bracket 510 and short bracket 540. Panels 10 may be retained on tall bracket 510 and short bracket 540 with the clamp assemblies described herein. Moreover, the system may include an electrically conductive path (e.g., a bond path) that electrically links each of the components together as discussed herein. Moreover, system 500 may be height adjustable. In this regard, each of the tall brackets 510 and short brackets 540 may be operatively coupled to one or more spacers 538.

In various embodiments and with reference to FIGS. 6A-6B and 7A-7B, the spacers described herein may be configured to define an installation angle θ. That installation angle θ, may be the same as the installation angle when a panel is attached to the tall base or short base as discussed herein. While the spacer may provide the same angle, the spacers allow for additional height for installed modules.

In various embodiments and with reference to FIGS. 8A-8D, system 800 may include a leveling assembly. The leveling assembly may be a portion of claim assembly 824. The leveling assembly may be installable on either the tall base or the short based as discussed herein. Moreover, the leveling assembly may be configured to change the angle or orientation of the panels when the panels are installed on system 800. In this regard, the leveling assembly may be configured to adjust the angle of the panel when installed.

In various embodiments, the leveling assembly may include a plate 850 and a leveling element 852 (e.g., a level nut). Leveling element 852 may be integrally formed in plate 850. Plate 850 may also include a hole and may be installed over leveling element 852. In operation, plate 850 may be movable up and down along fastener 830 in response to leveling element 852 being actuated.

In various embodiments, system 900 may include a wire management system. The wire management system may be configured to support and/or carry various wires and/or cables connecting one or more solar panels to one another. In this regard, tall base 910 and/or short base 940 may include one or more hooks 960. Hook 960 may be integrally formed in body 912 or body 944. Hook 960 may also be operatively coupled to body 912 or body 944. Hook 960 may include one or more attachment points (e.g., a hole, a standoff, and/or the like) that can be used to secure wires to hook 960.

In various embodiments, the mounting systems described herein may also be configured to mount a solar panel array to standing seam metal roof. The mounting system described herein may be configured as a rail-less or rail-free mounting system.

Figure 10A:
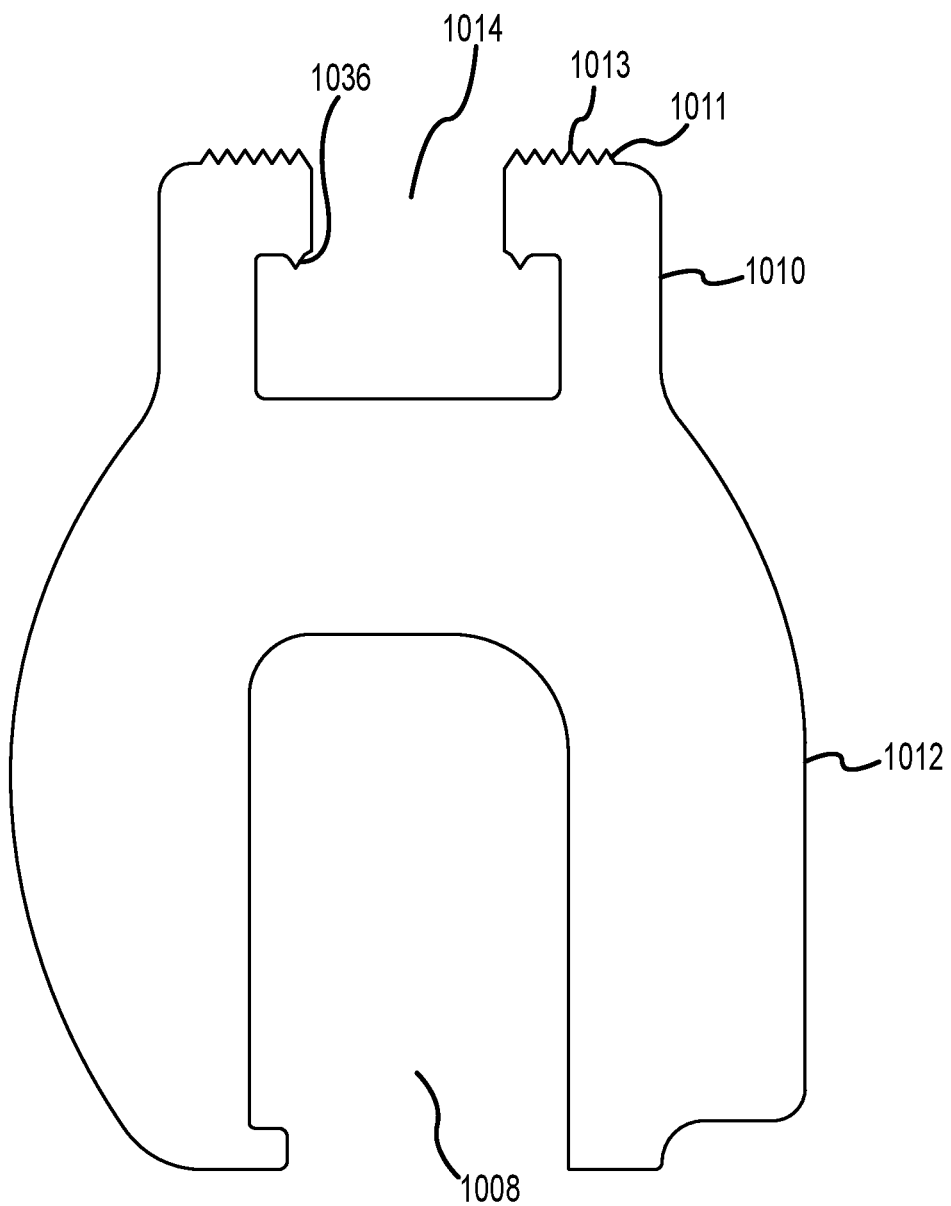
FIGS. 10A-10B illustrate views of a portion of a first standing seam metal roof mounting system, in accordance with various embodiments.
Figure 10B:
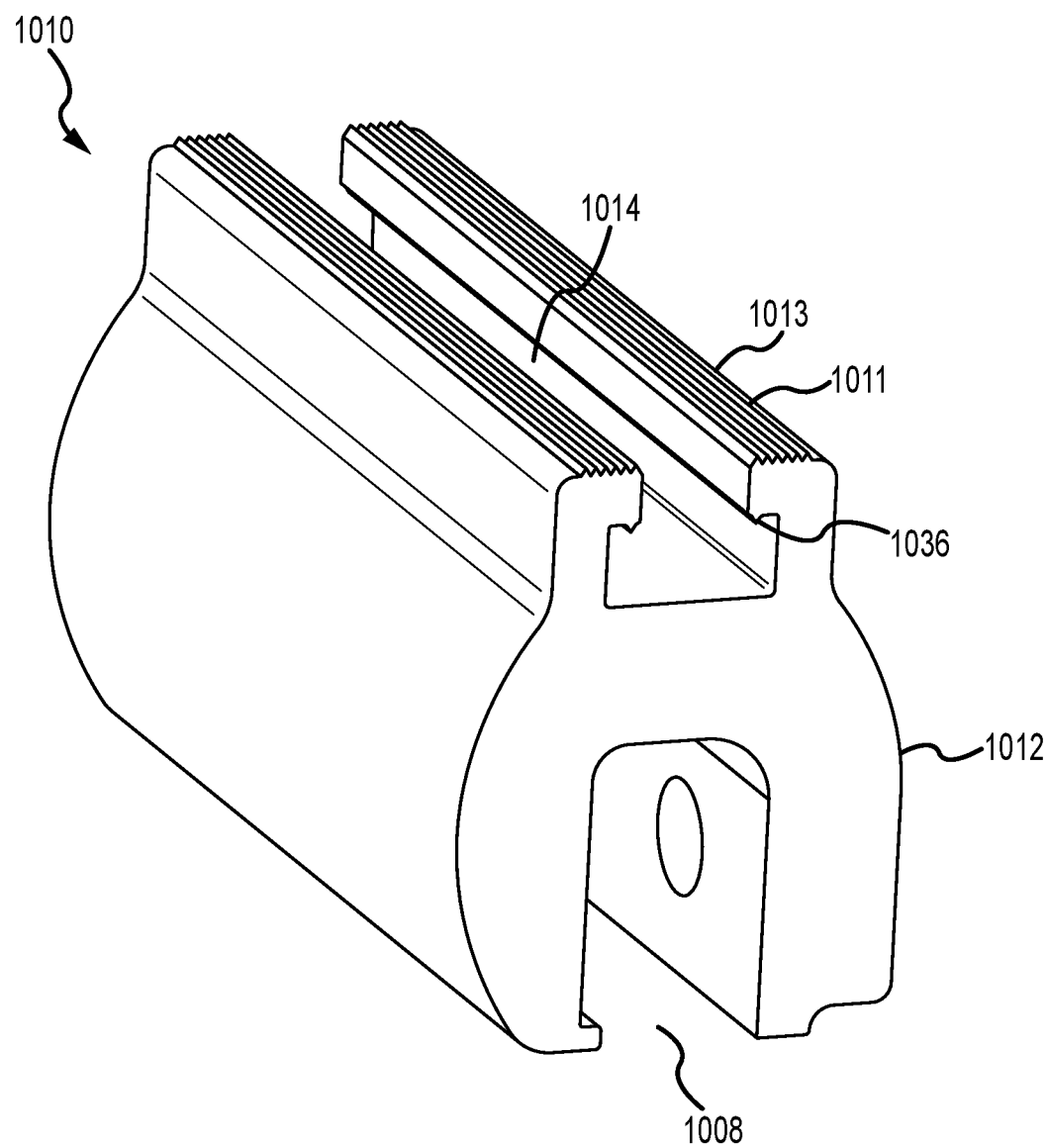

In various embodiments and with reference to FIGS. 10A-10B, a solar panel support system may be configured to attach a solar panel to a roof (e.g., a standing seam metal roof). The system may comprise a mounting bracket 1010. Mounting bracket 1010 may include a body 1012, an attachment point 1014. Attachment point 1014 may be formed in or operatively coupled to body 1012. In this regard, attachment point 1014 may be a slot or channel. Attachment point 1014 may comprise one or more points 1036. A fastener may be configured to contact and/or deform a portion of point 1036. Point 1036 may also be configured to retain a fastener and/or prevent fastener walk be creating an interference fit. In this regard, the fastener may create an electrically conductive path (e.g., a bond path as required by UL 2703 or a similar standard). between attachment point 1014 and a clamp assembly and/or solar panel, as discussed herein. Attachment point 1014 may also include a bearing surface 1011 that is configured to engage and support a solar panel or other structure on a roof. Bearing surface 1011 may include and/or comprise a plurality of serrations or teeth 1013 that are configured to engage a solar panel frame and/or other roof mounted structure. Body 1012 may also include a channel and/or slot 1008. Slot 1008 may be installable on a seam of a standing seam metal roof. Moreover, slot 1008 may be disposed substantially parallel to attachment point 1014.

Figure 10C:
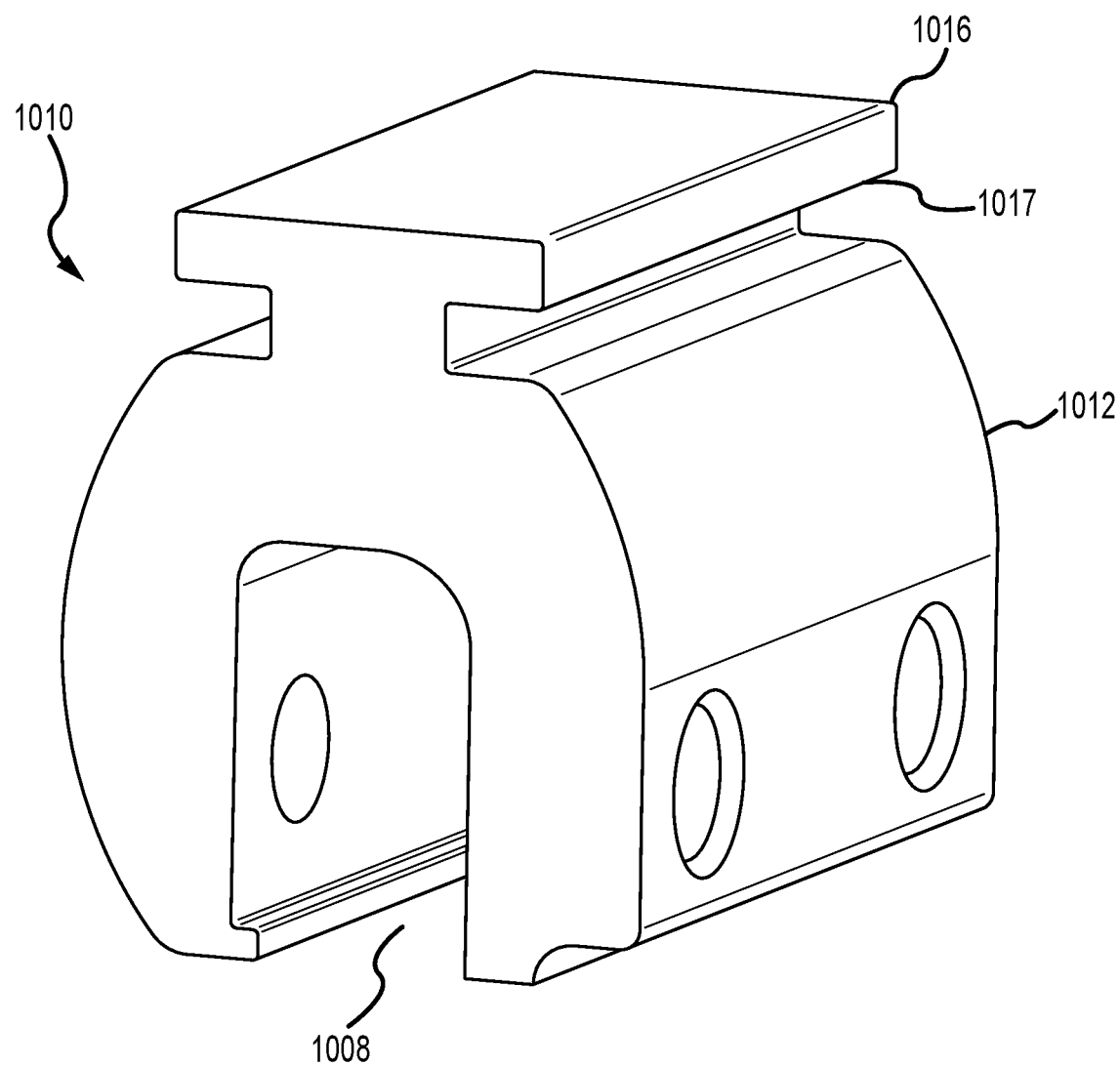
FIG. 10C illustrates a view of a portion of a second standing seam metal roof mounting system, in accordance with various embodiments.

In various embodiments and with reference to FIG. 10C, attachment point 1014 may be a protrusion 1016. Attachment point 1014 may also include one or more slot 1017 defined in body 1012 or protrusion 1016. Protrusion 1016 may also include one or more points (e.g., like point 1036 described herein). These points may protrude into slot 1017. The point may also be defined in protrusion 1016. Protrusion 1016 may have a T profile. Protrusion 1016 may also have any other suitable profile.

Figure 11A:
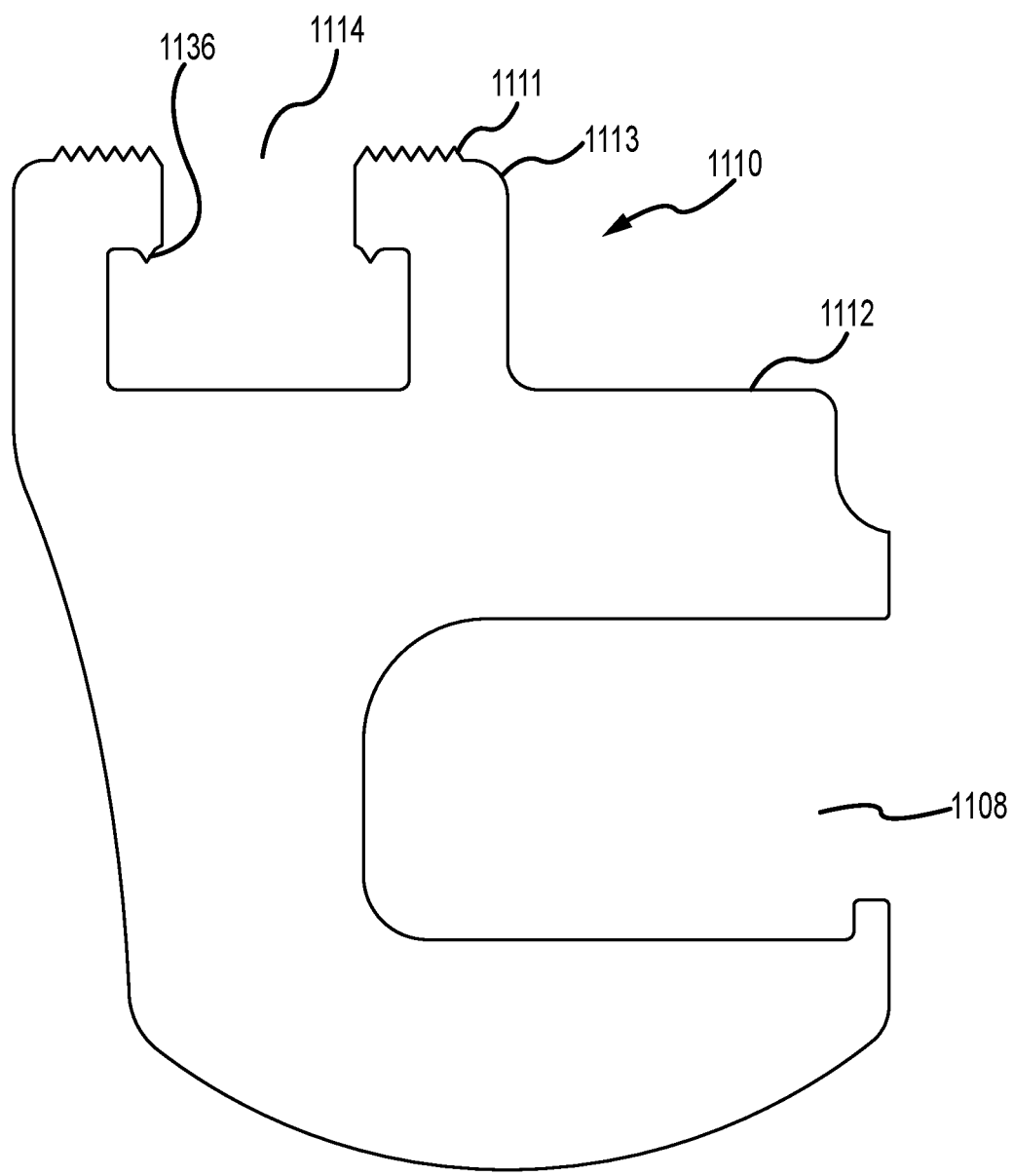
FIGS. 11A-11B illustrate views of a portion of a third standing seam metal roof mounting system, in accordance with various embodiments.
Figure 11B:
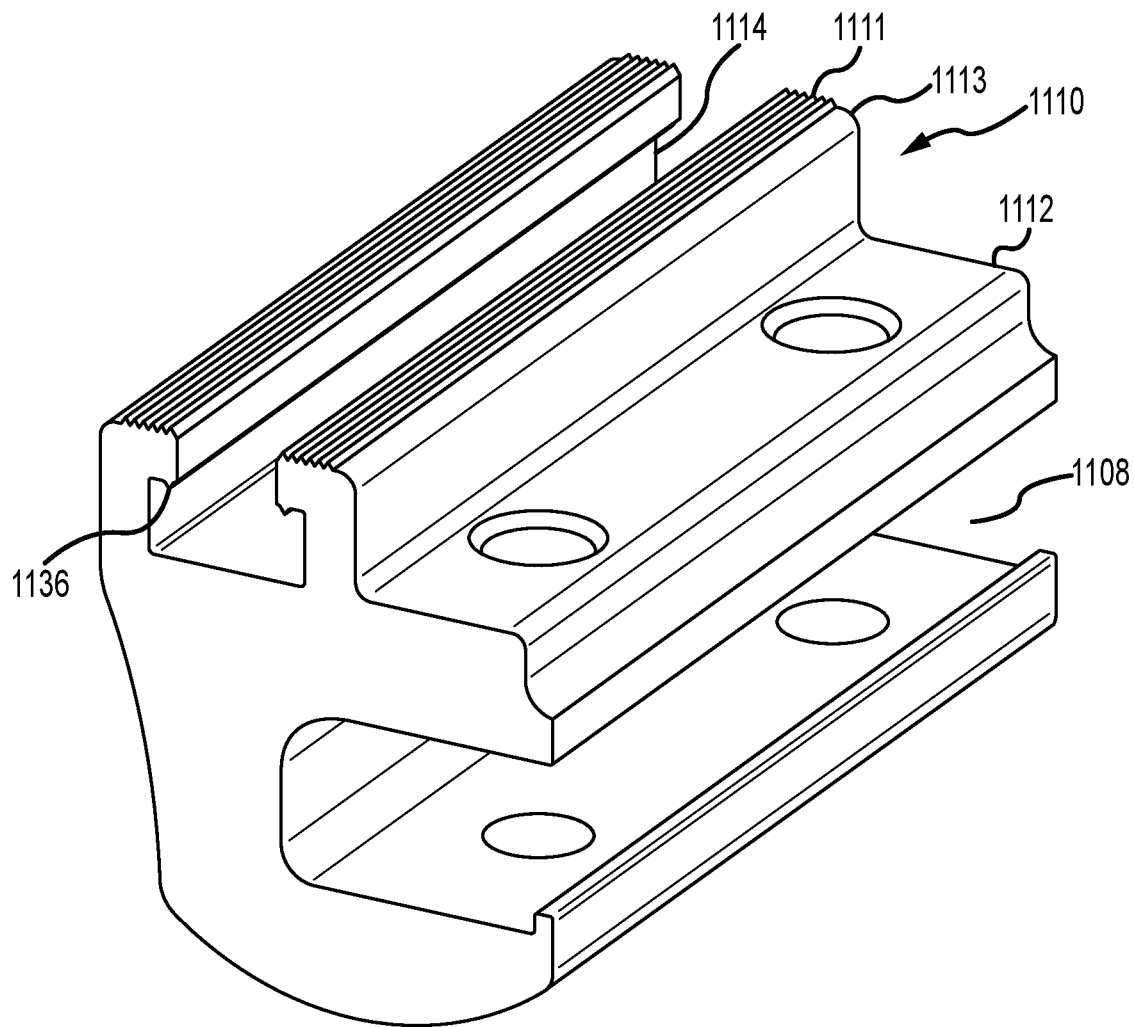
Figure 12A:
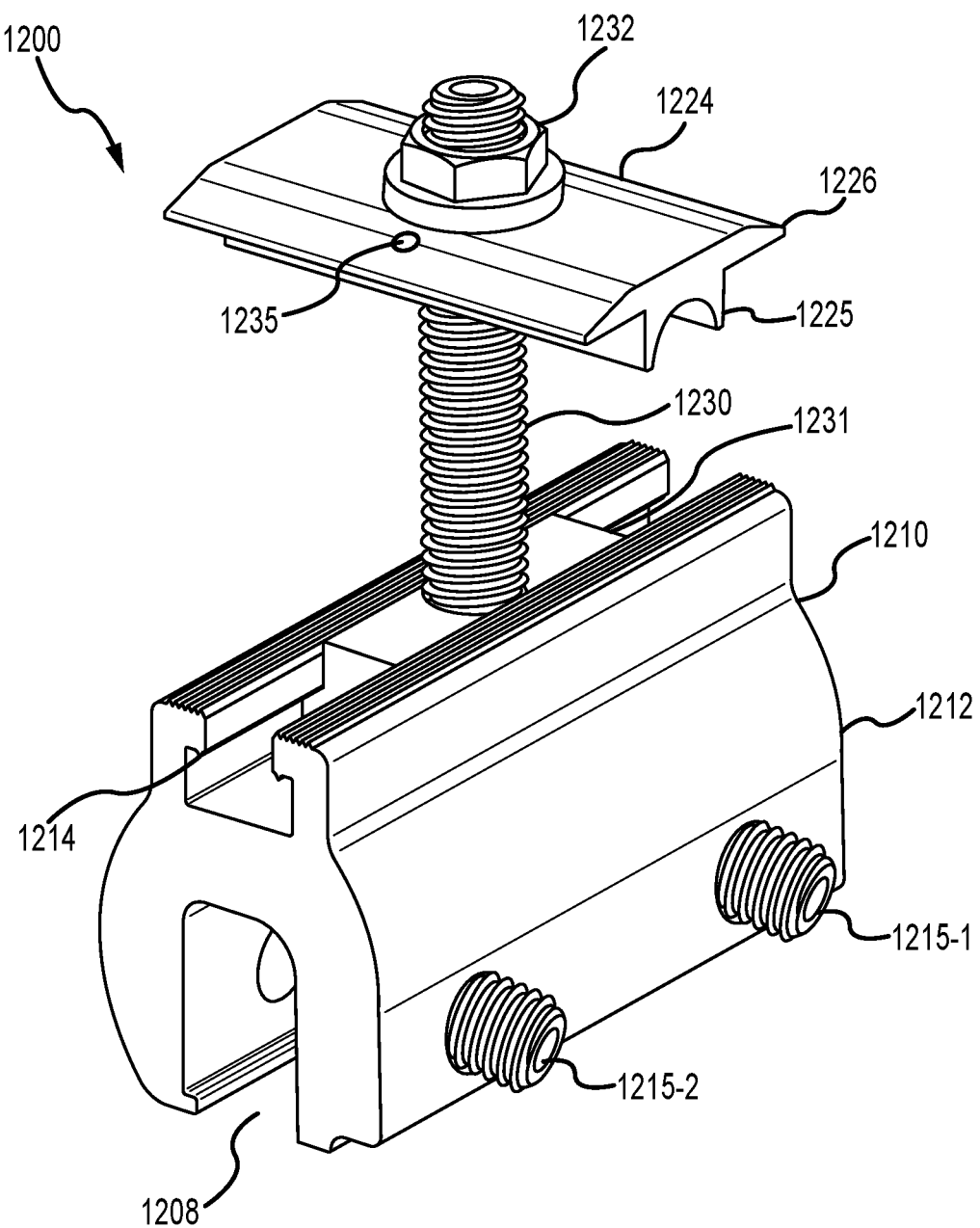
FIGS. 12A-12D illustrate views of a standing seam metal roof mounting system including, in accordance with various embodiments.
Figure 12B:
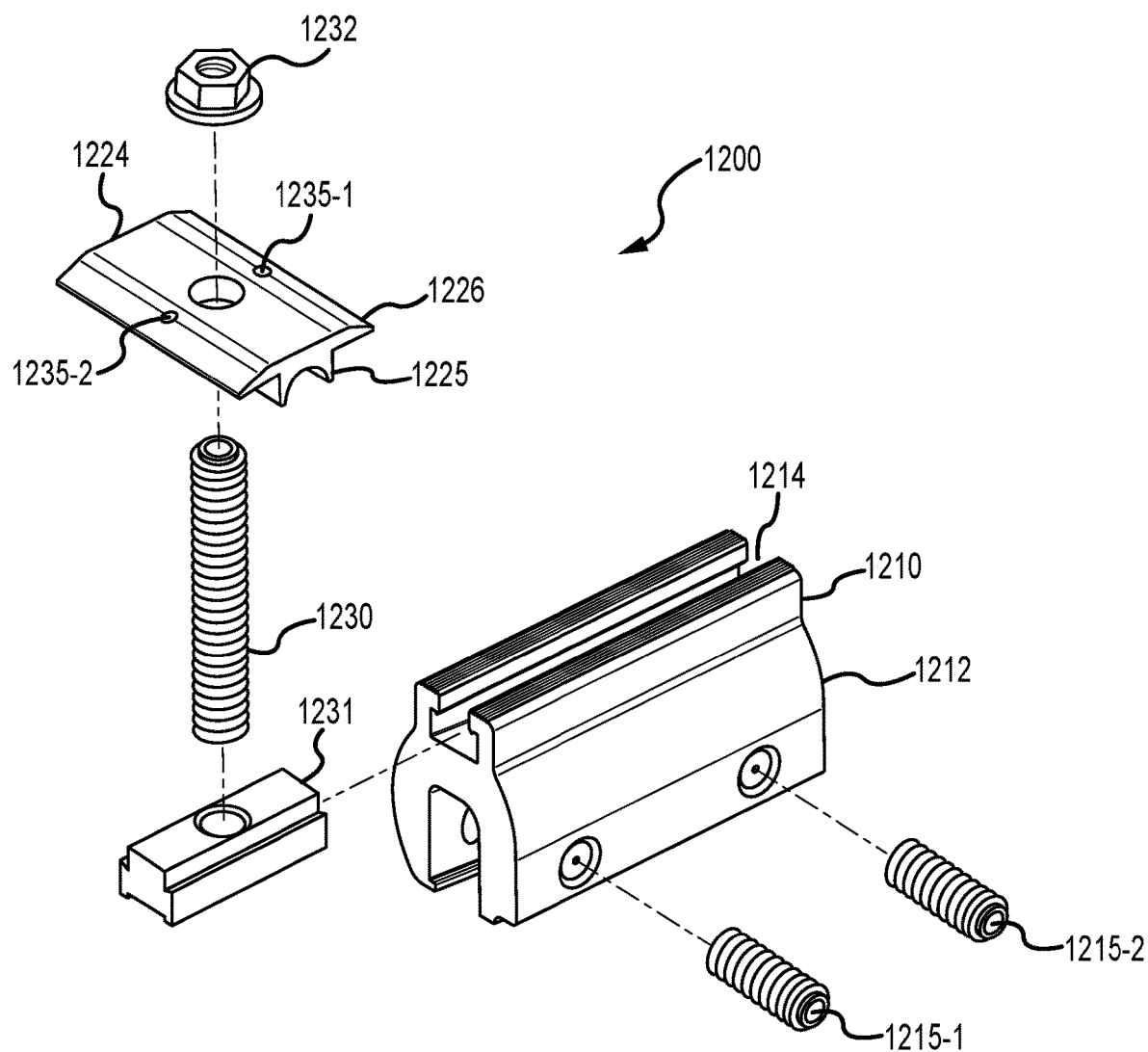
Figure 12C:
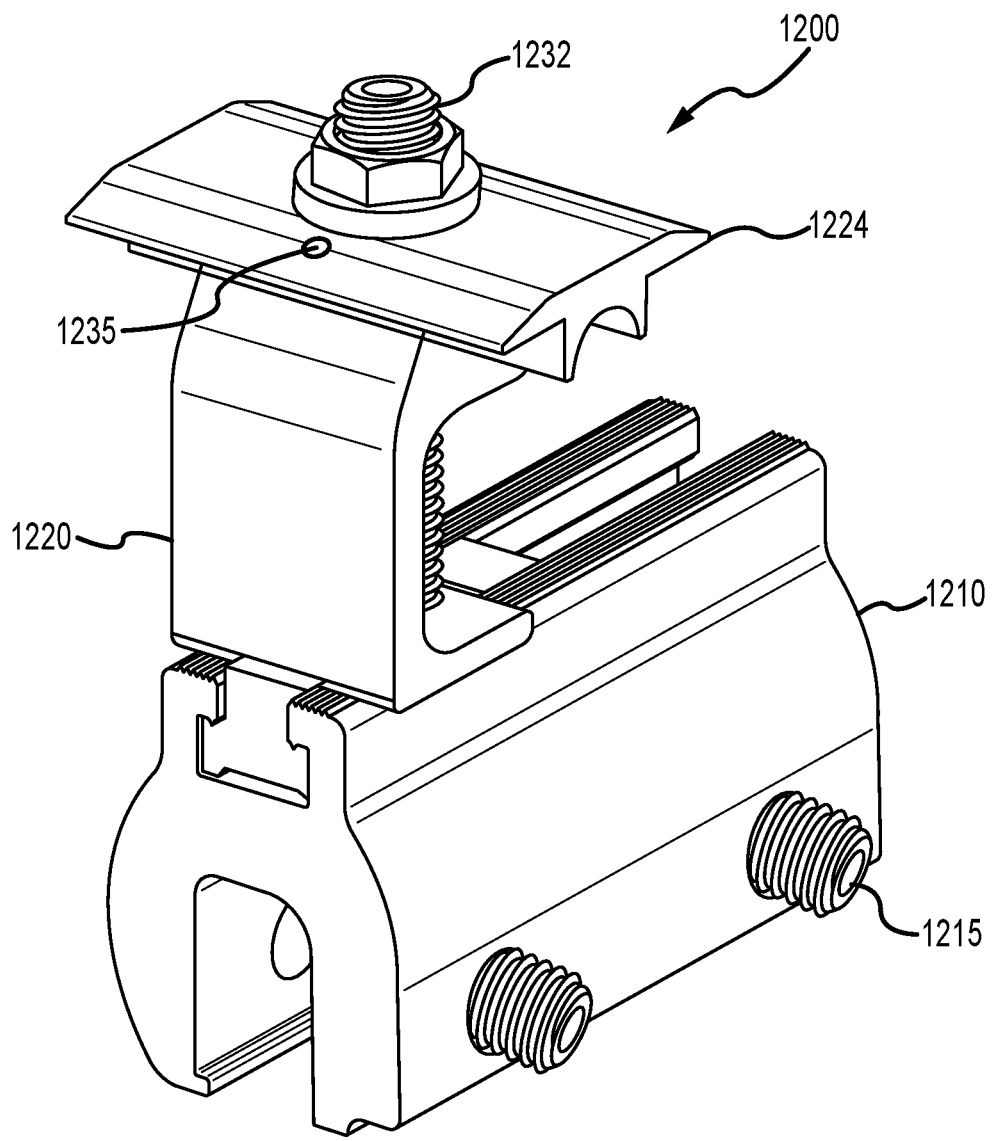
Figure 12D:
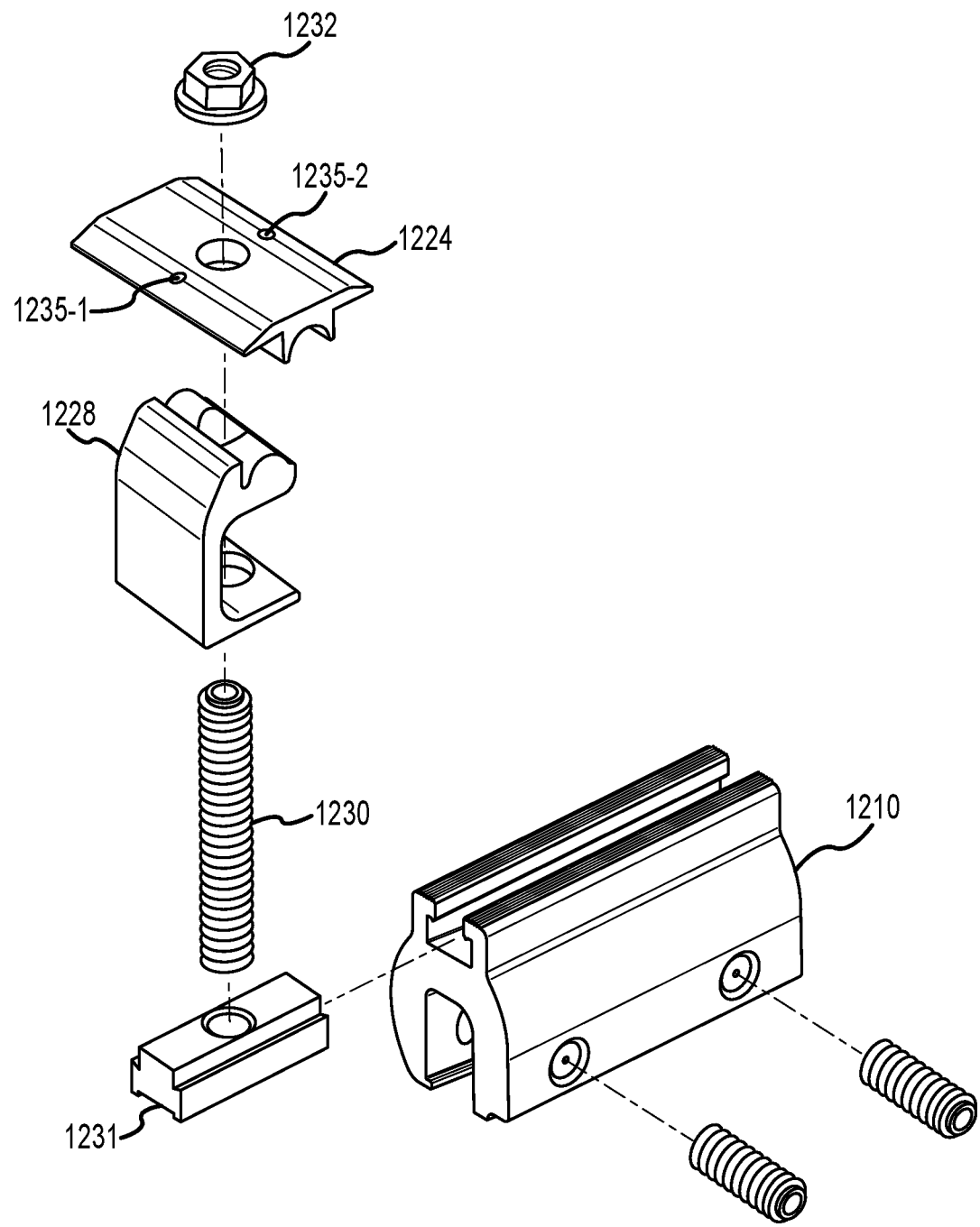

In various embodiments and with reference to FIGS. 11A-11B, a solar panel support system may be configured to attach a solar panel to a roof (e.g., a standing seam metal roof). The system may comprise a mounting bracket 1110. Mounting bracket 1110 may include a body 1112, an attachment point 1114. Attachment point 1114 may be formed in or operatively coupled to body 1112. In this regard, attachment point 1114 may be a slot, channel or protrusion as discussed herein. Attachment point 1114 may comprise one or more points 1136. A fastener may be configured to contact and/or deform a portion of point 1136. Point 1136 may also be configured to retain a fastener and/or prevent fastener walk be creating an interference fit. In this regard, the fastener may create an electrically conductive path (e.g., a bond path as required by UL 2703 or a similar standard). between attachment point 1114 and a clamp assembly and/or solar panel, as discussed herein. Attachment point 1114 may also include a bearing surface 1111 that is configured to engage and support a solar panel or other structure on a roof. Bearing surface 1111 may include and/or comprise a plurality of serrations or teeth 1113 that are configured to engage a solar panel frame and/or other roof mounted structure. Body 1112 may also include a channel and/or slot 1108. Slot 1108 may be installable on a seam of a standing seam metal roof. Moreover, slot 1108 may be disposed substantially perpendicular to attachment point 1114.

In various embodiments, system 1200 may comprise clamp assembly 1224. Clamp assembly 1224 may be mounted to body 1212 via attachment point 1214. Clamp assembly 1224 may comprise clamp 1226, fastener 1230 and nut 1232. Clamp 1226 may be stainless steel. Clamp 1226 may also comprise one or more pins 1235, which are also shown as 1235-1 and 1235-2. In this regard, pin 1235 may be configured to create an electrically conductive path between solar panel and clamp assembly 1224 and/or system 1200, as described herein. Clamp 1226 may also include a spacer portion 1225. Spacer portion 1225 may be installable with clamp 1226 and/or integrally formed in clamp 1226. Spacer portion 1225 may be configured to abut and/or engage a solar panel frame. In this regard, spacer portion 1225 may be configured to provide substantially uniform spacing between solar panels in a solar panel array.

In various embodiments, body 1212 may also include one or more holes. The holes may be configured to receive and retain set screws 1215, which are also shown as set screw 1215-1 and set screw 1215-2. Set screw 1215 may pass through body 1212 via the hole and into slot and/or channel 1208. Set screw 1215 may be configured to engage the standing seam or a metal roof. In this regard, set screw 1215 is configured to retain body 1212 and/or system 1200 on the standing seam.

In various embodiments, fastener 1230 may be a bolt. Fastener 1230 may also be a threaded rod that thread into a t-nut 1231. The head of the bolt and/or t-nut 1231 may be installable in and/or configured to engage attachment point 1214.

In various embodiments, Clamp assembly 1224 may also comprise a spacer block 1228. Spacer block 1228 may be optionally installed at the end of column of panels in an array. In this regard, spacer bock 128 may simulate the frame of a solar module so that clamp assembly 124 properly engages and retains the module at the end of the array. Spacer block 128 may be any suitable size. For example, spacer block 128 may be installable in two or more orientations. In this regard, spacer block 128 may be configured to provide various heights that replicate the various thicknesses of solar panel frames (e.g., 32 mm, 33 mm, 35, mm, 38 mm, 40 mm, 45 mm, 50 mm and/or any other suitable height).

Figure 13:
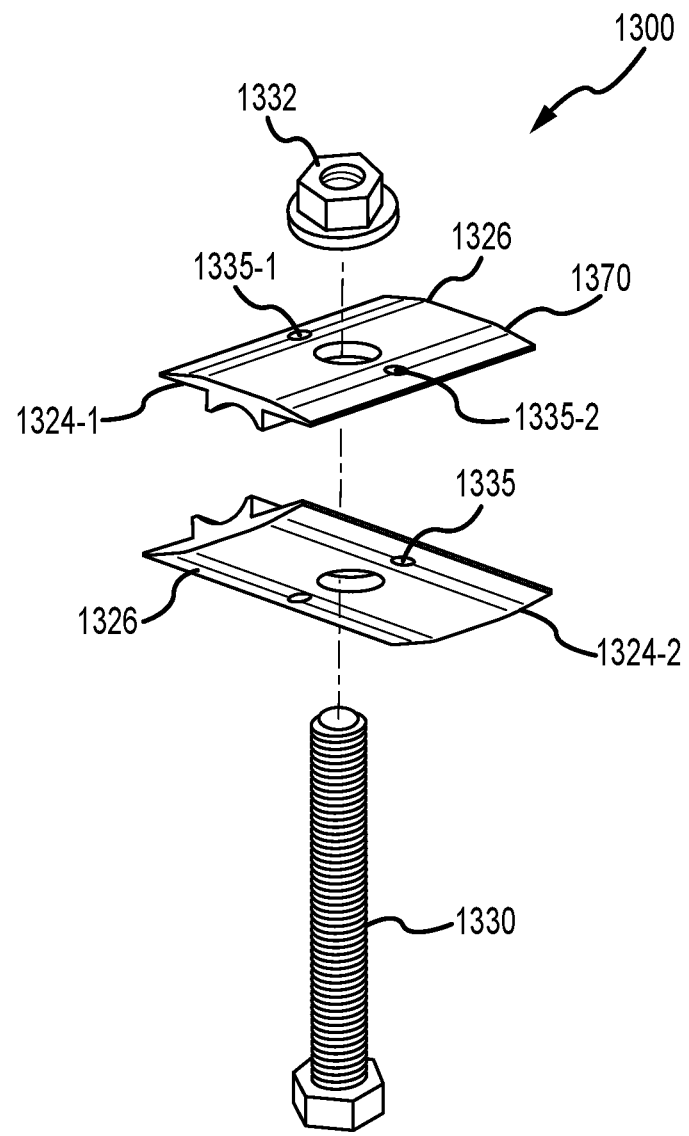
FIG. 13 illustrates a view of a coupling for a roof mounting system including, in accordance with various embodiments.

In various embodiments and with reference to FIG. 13, system 1300 may include a coupling 1370. Coupling 1370 may comprise a fastener 1330, a first clamp assembly 1324-1, a second clamp assembly 1324-2, and one or more nuts 1332. Fastener 1330 may be a bolt or a threaded rod. Each clamp assembly 1324 may comprise a clamp 1326 and one or more pins or teeth 1335. Clamp 1326 may be stainless steel and may include teeth that are configured to create an electrically conductive path between clamp 1326 and a solar panel frame. Clamp 1326 may also comprise one or more pins 1335, which are also shown as 1335-1 and 1335-2. In this regard, pin 1335 may be configured to create an electrically conductive path between solar panel and clamp assembly 1324, as described herein. Moreover, the couplings 1370 may be installed in a solar panel array between rows of panels to facilitate electrical bonding vertically (North-South) and horizontally (East-West) across the array, as may be required of a solar panel array under applicable building and safety codes.

Figure 14A:
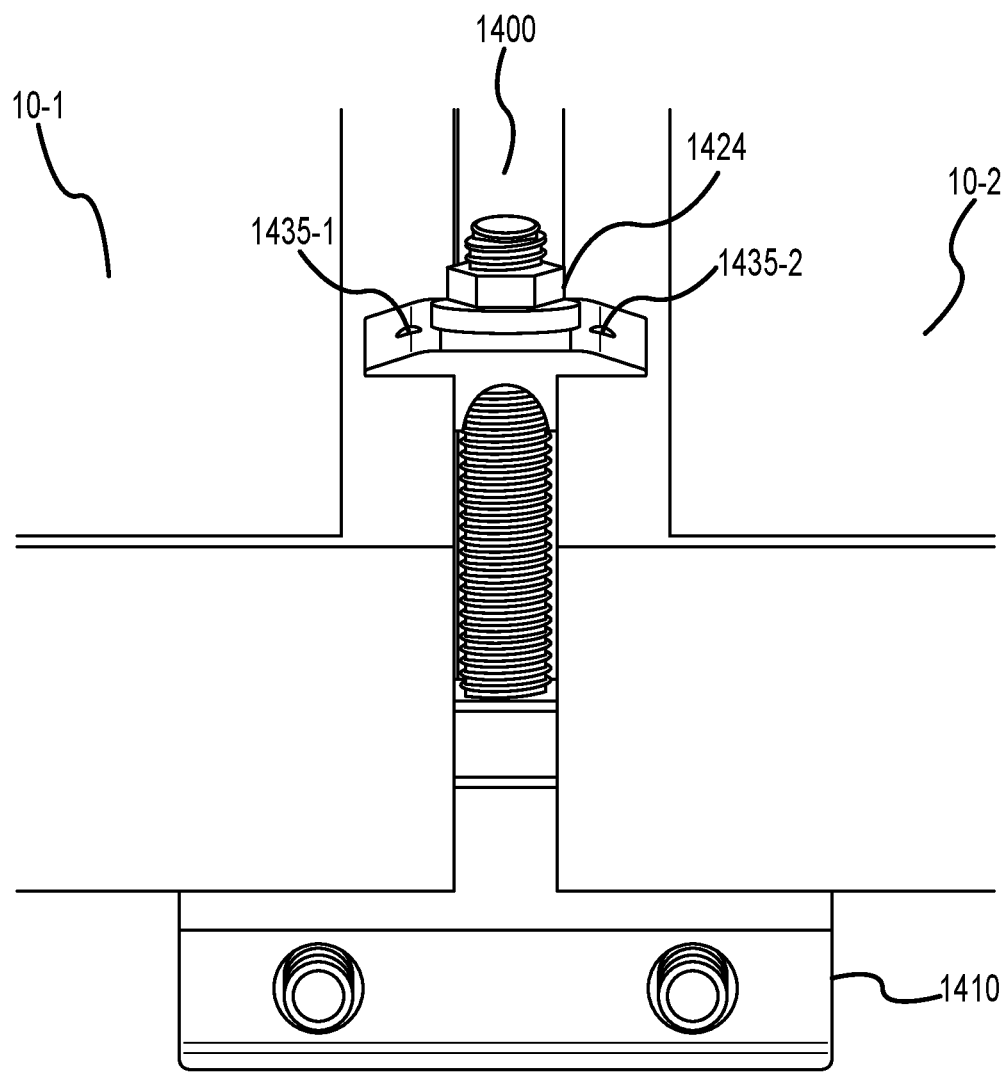
FIGS. 14A-14C illustrate views of a standing seam metal roof mounting system installed as a rail free solar panel array, in accordance with various embodiments.
Figure 14B:
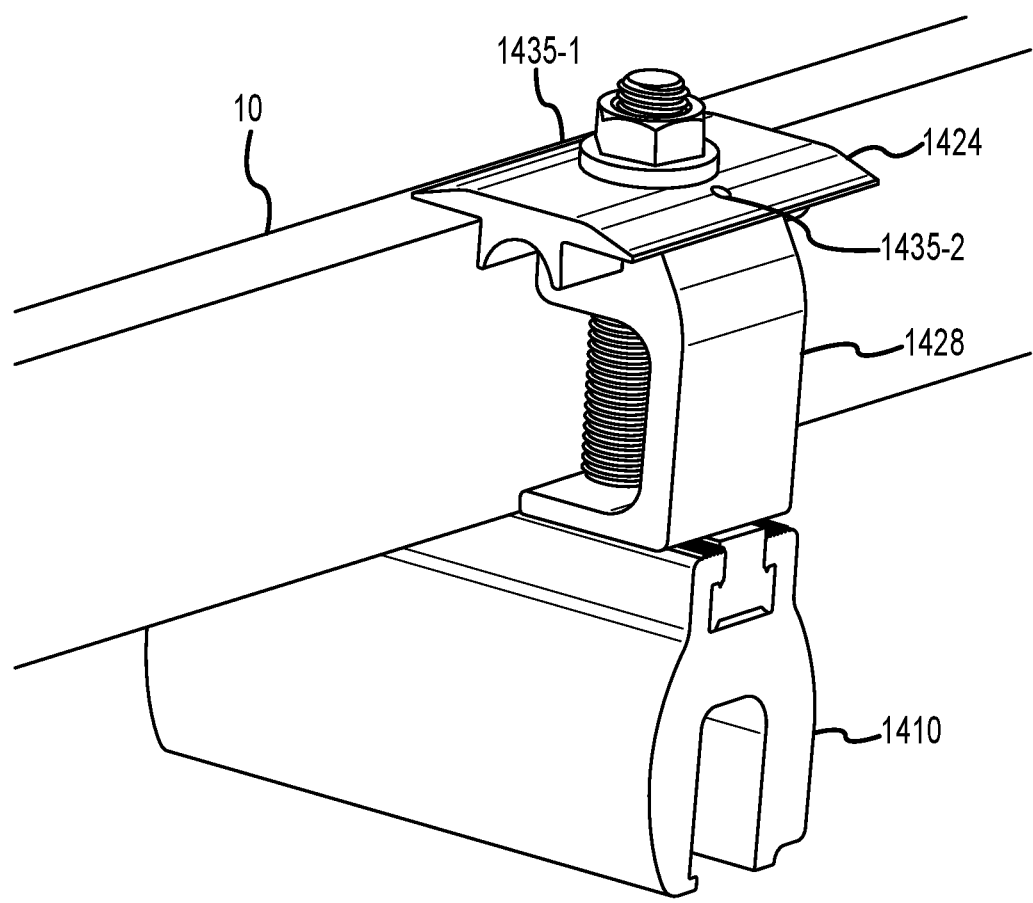
Figure 14C:
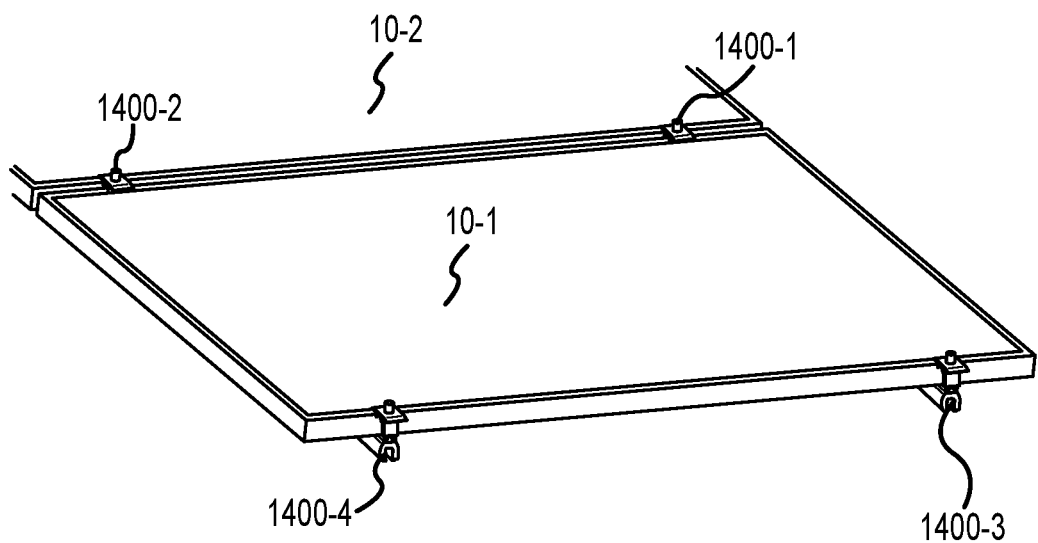

In various embodiments and with reference to FIGS. 14A-14C, system 1400 may be configured as a rail free solar panel mounting system. In this regard, the system may be laid out with a plurality of systems 1400 (e.g., system 1400-1, system 1400-2, system 1400-3, system 1400-4, and/or the like). Two solar panels 10 may be mounted on each system 1400 as shown in FIG. 14A. In this regard, mounting bracket 1410 may receive and support solar panel 10-1 and solar panel 10-2. Panels 10 may be retained on mounting bracket 1410 with the clamp assembly 1424, as described herein. Moreover, the system may include an electrically conductive path (e.g., a bond path) through pins 1435-1 and 1435-2 or clamp assembly 1424. In this regard, the components of the array are electrically linked to each other, as discussed herein. The ends of the array may include system 1400 mounts that include spacer bracket 1428 as shown in FIG. 14B.

In various embodiments, the mounting systems described herein may also be configured to mount a solar panel array to various roof types (e.g., composite shingle roofs, slate roofs, tile roofs, and/or the like). The mounting system described herein may be configured as a rail-less or rail-free mounting system.

Figure 15A:
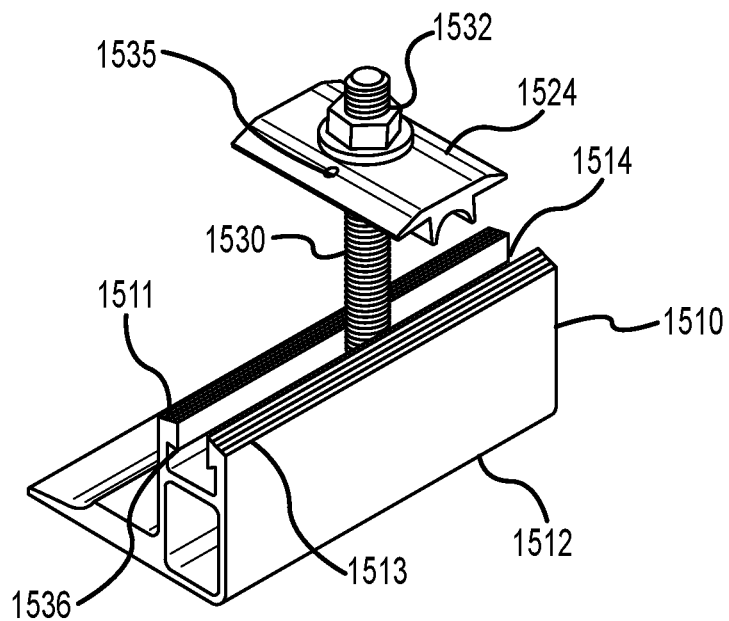
FIGS. 15A-15B illustrate views of a rail free roof mounting system including, in accordance with various embodiments.
Figure 15B:
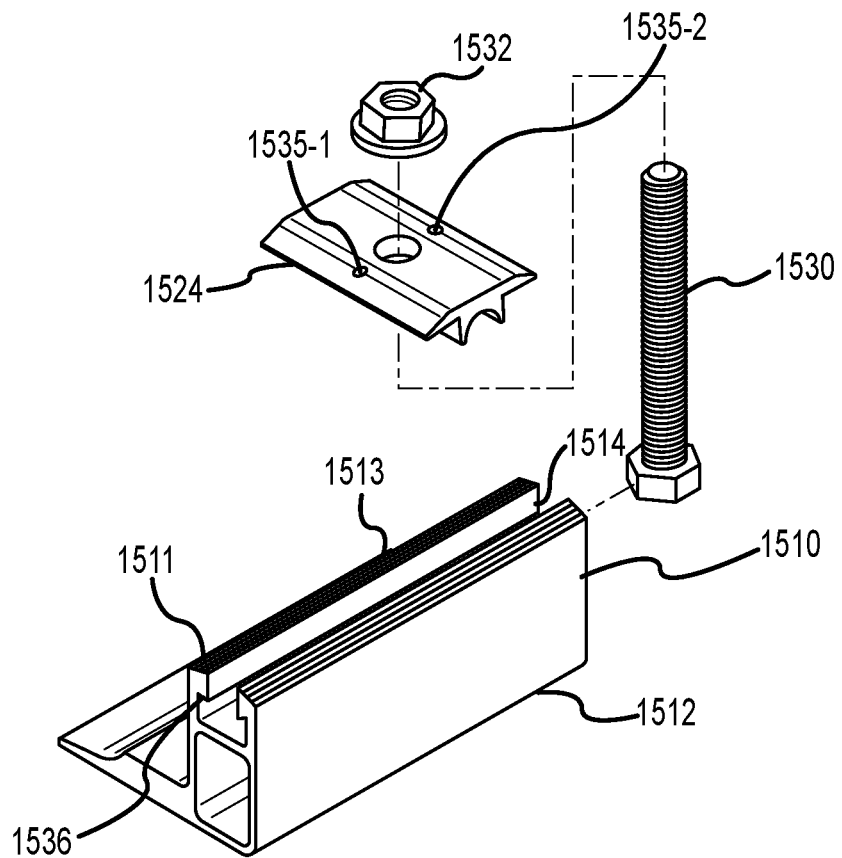
Figure 16A:
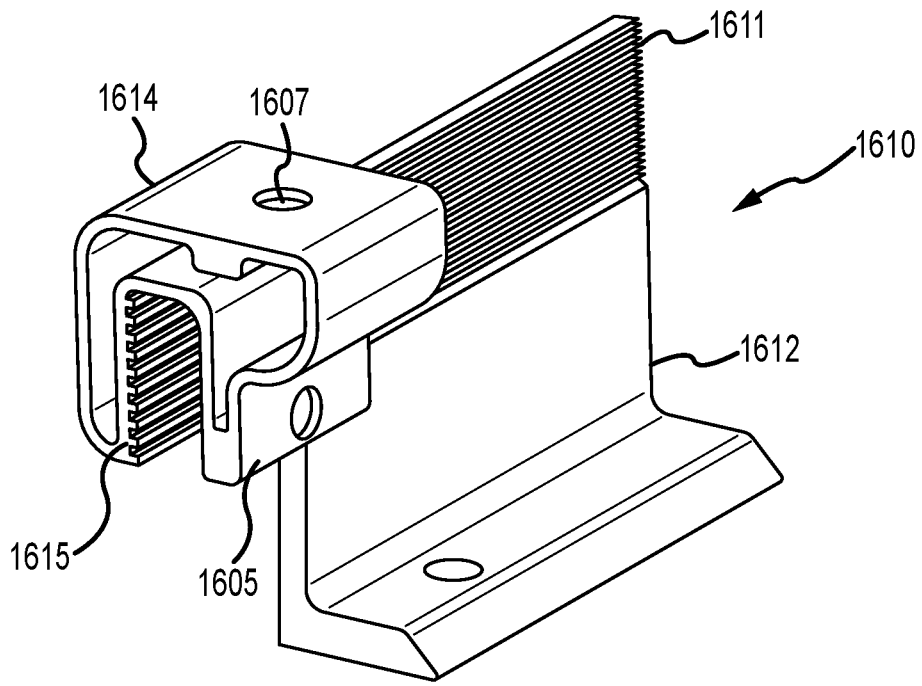
FIGS. 16A-16D illustrate views of a portion of a roof mounting system including, in accordance with various embodiments.
Figure 16B:
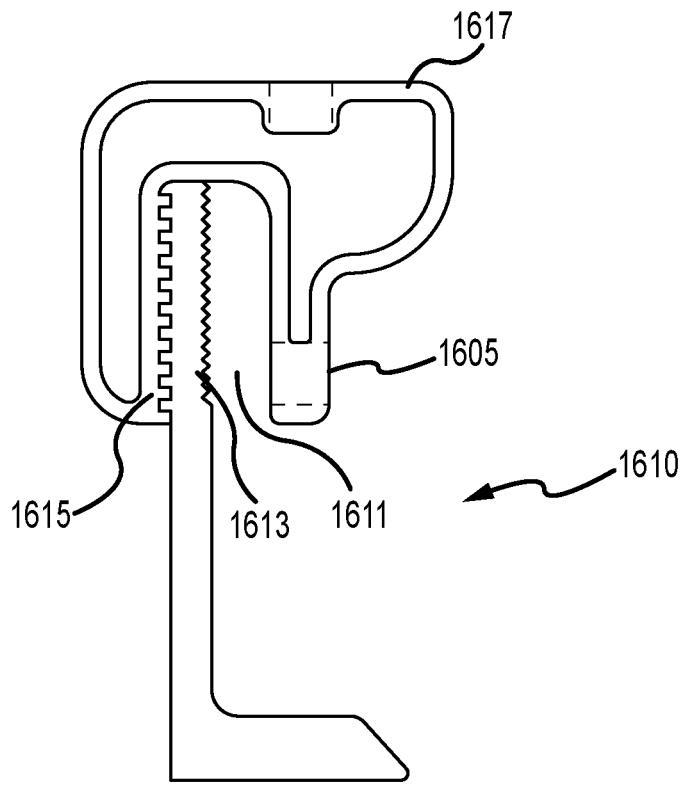
Figure 16C:
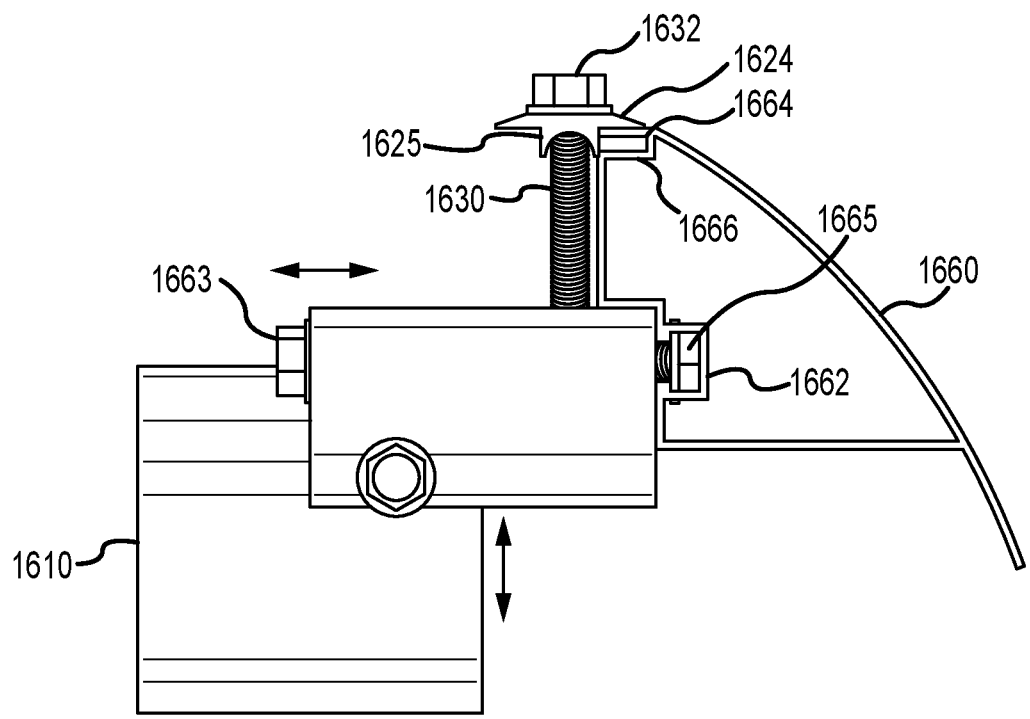
Figure 16D:
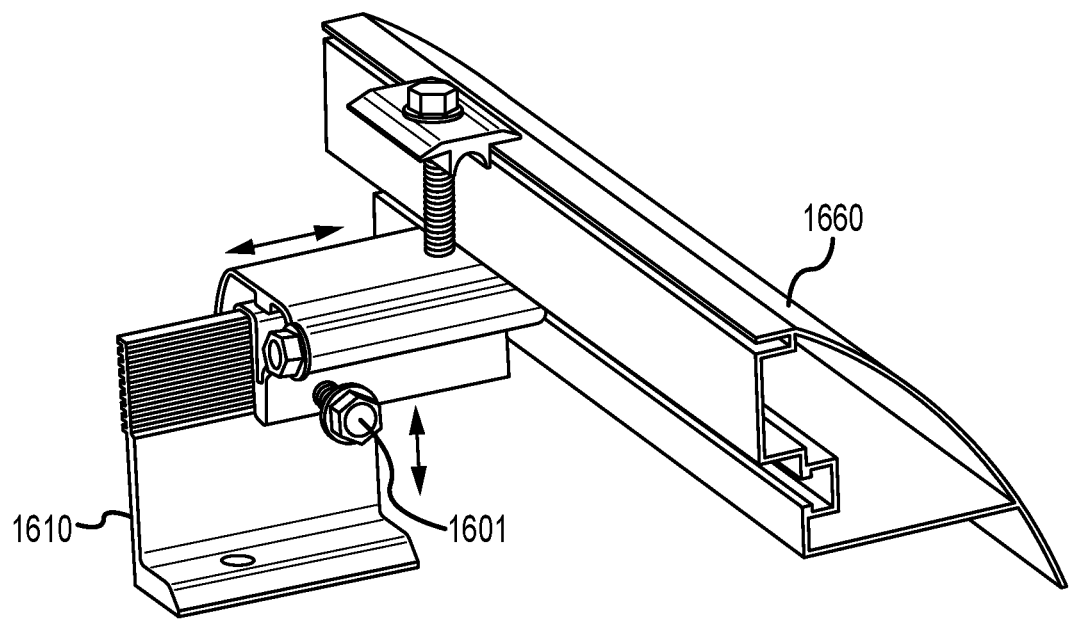

In various embodiments and with reference to FIGS. 15A-15B, a solar panel support system may be configured to attach a solar panel to a roof. The system may comprise a mounting bracket 1510. Mounting bracket 1510 may include a body 1512, an attachment point 1514. Attachment point 1514 may be formed in or operatively coupled to body 1512. In this regard, attachment point 1514 may be a slot or channel. Attachment point 1514 may comprise one or more points 1536. A fastener may be configured to contact and/or deform a portion of point 1536. Point 1536 may also be configured to retain a fastener and/or prevent fastener walk be creating an interference fit. In this regard, the fastener may create an electrically conductive path (e.g., a bond path as required by UL 2703 or a similar standard). between attachment point 1514 and a clamp assembly and/or solar panel, as discussed herein. Attachment point 1514 may also include a bearing surface 1511 that is configured to engage and support a solar panel or other structure on a roof. Bearing surface 1511 may include and/or comprise a plurality of serrations or teeth 1513 that are configured to engage a solar panel frame and/or other roof mounted structure. Body 1512 may also include a mounting point (e.g., a hole defined through body 1512). The mounting point may be configured to receive a fastener. In this regard body 1512 and/or system 1500 is secured to a roof surface.

In various embodiments, system 1500 may comprise clamp assembly 1524. Clamp assembly 1524 may be mounted to body 1512 via attachment point 1514. Clamp assembly 1524 may comprise clamp 1526, fastener 1530 and nut 1532. Clamp 1526 may be stainless steel. Clamp 1526 may also comprise one or more pins 1535, which are also shown as 1535-1 and 1535-2. In this regard, pin 1535 may be configured to create an electrically conductive path between solar panel and clamp assembly 1524 and/or system 1500, as described herein. Clamp 1526 may also include a spacer portion 1525. Spacer portion 1525 may be installable with clamp 1526 and/or integrally formed in clamp 1526. Spacer portion 1525 may be configured to abut and/or engage a solar panel frame. In this regard, spacer portion 1525 may be configured to provide substantially uniform spacing between solar panels in a solar panel array.

In various embodiments, fastener 1530 may be a bolt. Fastener 1530 may also be a threaded rod that thread into a t-nut, as described herein. The head of the bolt and/or t-nut may be installable in and/or configured to engage attachment point 1514.

In various embodiments and with reference to FIGS. 16A-16D, a rail free solar panel support system may be configured to attach a solar panel to a roof. The system may comprise a mounting bracket 1610. Mounting bracket 1610 may include a body 1612, an attachment point 1614. Attachment point 1614 may be adjustably coupled to body 1612. Body 1612 may comprise a plurality of serrations on a first side. Body 1612 may also comprise a plurality of channels 1613. Attachment point 1614 may comprise a plurality of channels 1615. Channels 1613 and channels 1615 may have complimentary profiles. In this regard, attachment point 1614 may be adjustably installed along the length of body 1612. Moreover, the height of attachment point 1614 may also be adjusted relative to body 1612 and/or a roof surface. Attachment point 1614 may also include a hole 1605. Hole 1605 may be configured to receive a fastener 1601. Fastener 1601 may be configured to engage body 1612. Fastener 1601 may engage serrations 1611 of body 1612. In this regard, serrations 1611 may interlock with fastener 1601 preventing attachment point 1614 from moving relative to body 1612. Attachment point 1614 may also include a bearing surface 1617 that is configured to engage and support a solar panel or other structure on a roof. Body 1612 may also include a mounting point (e.g., a hole defined through body 1612). The mounting point may be configured to receive a fastener. In this regard body 1612 and/or system 1600 is secured to a roof surface.

In various embodiments, system 1600 may comprise clamp assembly 1624. Clamp assembly 1624 may be mounted to body 1612 via attachment point 1614. Clamp assembly 1624 may comprise clamp 1626, fastener 1630 and nut 1632. Clamp 1626 may be stainless steel. Clamp 1626 may also comprise one or more pins 1635, which are also shown as 1635-1 and 1635-2. In this regard, pin 1635 may be configured to create an electrically conductive path between solar panel and clamp assembly 1624 and/or system 1600, as described herein. Clamp 1626 may also include a spacer portion 1625. Spacer portion 1625 may be installable with clamp 1626 and/or integrally formed in clamp 1626. Spacer portion 1625 may be configured to abut and/or engage a solar panel frame. In this regard, spacer portion 1625 may be configured to provide substantially uniform spacing between solar panels in a solar panel array. Fastener 1630 may be a bolt. Fastener 1630 may also be a threaded rod that threads into a hole 1607 in attachment point 1614.

In various embodiments, system 1600 may also comprise or be configured to receive a skirt or deflector 1660. Deflector 1660 may have any suitable profile. Deflector 1660 may be mountable to attachment point 1614 with a fastener 1665. Fastener 1665 may be retained in attachment point 1614 in any suitable fashion (e.g., by nut 1663). Fastener 1665 may be installable in deflector 1660 in slot 1662. Moreover, deflector 1660 may be configured to accommodate multiple sizes of panels by providing a plurality of engagement points. For example, clamp assembly 1624 may be configured to engage deflector 1660 at a first point 1664 to accommodate a first panel size and at a second point 1666 to accommodate a second panel size.

In various embodiments, the systems described herein may be used with any suitable roof mounted structure including, for example, a solar panel array or system, an environmental conditioning system (e.g., HVAC, swamp cooler, and/or the like), a water system (e.g., a solar water heater, a water storage system, and/or the like). The systems may also be used with any suitable concrete or ceramic tile system. In this regard, the systems described herein provide a universal, watertight flashing system for tile style roofs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for mounting solar panels to a concrete roof, comprising:
   a body comprising a cross support dividing a hollow defined in the body, a base and an attachment point coupled to a first end of the base and a foot coupled to a second end of the base, the attachment point including:
      a bearing surface extending along the length of the attachment point,
      a channel defining a portion through the attachment point and an opening through the bearing surface, and
      a point having an angular profile and disposed in and extending along the length of the attachment point into the portion of the channel;
   a fastener slidably installable in the channel, the fastener configured to engage within the channel in response to the fastener being installed in the channel; and
   a clamp assembly slidably coupled to the body by the fastener,
   the clamp having a first portion, a second portion and a spacer portion disposed between the first portion and the second portion, and
   the clamp comprising a first electrically conductive pin disposed in the first portion and a second electrically conductive pin disposed in the second portion,
   wherein the first electrically conductive pin engages a first frame of a first solar panel in response to the first solar panel being installed on the body, and
   wherein the second electrically conductive pin engages a second frame of a second solar panel in response to the second solar panel being installed on the body.

2. The system for mounting solar panels to the concrete roof of claim 1, wherein the fastener includes at least one of a t-nut and a threaded rod or a bolt.

3. The system for mounting solar panels to the concrete roof of claim 1, wherein the clamp assembly creates an interference fit between the first electrically conductive pin and the first frame and the second electrically conductive pin the second frame in response to the first solar panel and the second solar panel being installed on the body.

4. The system for mounting solar panels to the concrete roof of claim 1, wherein the first electrically conductive pin and the second electrically conductive pin define an electrically conductive path through the clamp assembly.

5. The system for mounting solar panels to the concrete roof of claim 1, further comprising a leveling assembly installable on the fastener between the body and the clamp assembly.

6. The system for mounting solar panels to the concrete roof of claim 5, wherein the leveling assembly comprises a plate and a leveling element.

7. A mount for concrete roofs, comprising:
   a body defining a mounting point and including an attachment point, the attachment point comprising a channel defined below and through a bearing surface of the body, the bearing surface comprising a plurality of teeth, the plurality of teeth defined along a length of the attachment point, the teeth extending a first direction away from the bearing surface;
   a point having an angular profile, the point defined along a length of the body, the point protruding into the space defined by the channel in a second direction opposite the first direction, the point oriented substantially parallel to the plurality of teeth; and
   a clamp assembly comprising a clamp and a fastener, the clamp assembly slidably coupled to the body by the fastener disposed in the channel, wherein the point deforms in response to a solar panel being installed on the body.

8. The mount for concrete roofs of claim 7, wherein the clamp is stainless steel and comprises a tooth.

9. The mount for concrete roofs of claim 7, wherein the clamp comprises a first portion, a second portion and a spacer portion, the spacer portion disposed between the first portion and the second portion.

10. The mount for concrete roofs of claim 7, wherein the clamp comprises a first bonding pin and a second bonding pin.

11. The mount for concrete roofs of claim 10, wherein the first bonding pin is disposed in the first portion and the second bonding pin is disposed in the second portion.

12. The mount for concrete roofs of claim 10,
wherein the first bonding pin engages a first frame of a first solar panel in response to the first solar panel being installed on the body, and
wherein the second bonding pin engages a second frame of a second solar panel in response to the second solar panel being installed on the body.

13. The mount for concrete roofs of claim 10, wherein the first bonding pin and the second bonding pin define an electrically conductive path through the clamp.

14. The mount for concrete roofs of claim 7, wherein the clamp creates an interference fit between the serrated bearing surface, the point, a first frame and a second frame in response to a first solar panel and a second solar panel being installed on the body.

15. The mount for concrete roofs of claim 7, further comprising a leveling assembly installable on the fastener between the body and the clamp assembly.

16. The mount for concrete roofs of claim 15, wherein the leveling assembly comprises a plate and a leveling element.

\* \* \* \* \*